(12) United States Patent
Hampel et al.

(10) Patent No.: US 10,820,365 B2
(45) Date of Patent: Oct. 27, 2020

(54) TECHNIQUES FOR PROVIDING RADIO RESOURCE CONTROL AND FRONTHAUL CONTROL ON A WIRELESS FRONTHAUL LINK

(71) Applicant: QUALCOMM Incorporated, San Diego, CA (US)

(72) Inventors: Karl Georg Hampel, Hoboken, NJ (US); Hong Cheng, Bridgewater, NJ (US); Junyi Li, Chester, NJ (US); Navid Abedini, Raritan, NJ (US); Sundar Subramanian, San Diego, CA (US); Muhammad Nazmul Islam, Edison, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 16/058,358

(22) Filed: Aug. 8, 2018

(65) Prior Publication Data

US 2019/0053317 A1 Feb. 14, 2019

Related U.S. Application Data

(60) Provisional application No. 62/543,861, filed on Aug. 10, 2017.

(51) Int. Cl.
*H04W 76/27* (2018.01)
*H04W 76/00* (2018.01)
(Continued)

(52) U.S. Cl.
CPC .............. *H04W 76/27* (2018.02); *H04B 7/14* (2013.01); *H04W 28/085* (2013.01);
(Continued)

(58) Field of Classification Search
CPC ... H04W 76/27; H04W 76/15; H04W 28/085; H04B 7/14
See application file for complete search history.

(56) References Cited

U.S. PATENT DOCUMENTS

2010/0322146 A1 12/2010 Liu et al.
2013/0136078 A1* 5/2013 Bucknell ............... H04W 28/06
370/329

(Continued)

FOREIGN PATENT DOCUMENTS

EP 2601814 A1 6/2013

OTHER PUBLICATIONS

International Search Report and Written Opinion—PCT/US2018/046092—ISA/EPO—dated Oct. 29, 2018.
(Continued)

*Primary Examiner* — Siming Liu
(74) *Attorney, Agent, or Firm* — Linda G. Gunderson; Holland & Hart LLP

(57) ABSTRACT

Methods, systems, and devices for wireless communication are described that provide for transmitting different sets of control messages through a relay to a central unit (CU) and a core network of a wireless communications system. The different sets of control messages may include a first set of control messages for an access radio link between the relay and the CU and a second set of control messages for a fronthaul radio link between the relay and the CU. Techniques may include multiplexing of messages on a radio bearer (RB), establishment of separate RBs for different control messages, and encapsulation of one type of control message for transmission with the other type of control message.

55 Claims, 21 Drawing Sheets

(51) Int. Cl.
| | |
|---|---|
| *H04W 28/08* | (2009.01) |
| *H04W 88/08* | (2009.01) |
| *H04W 84/04* | (2009.01) |
| *H04W 76/15* | (2018.01) |
| *H04B 7/14* | (2006.01) |
| *H04W 92/20* | (2009.01) |
| *H04W 88/16* | (2009.01) |

(52) U.S. Cl.
CPC ........... *H04W 76/00* (2013.01); *H04W 76/15* (2018.02); *H04W 84/047* (2013.01); *H04W 88/085* (2013.01); *H04W 88/16* (2013.01); *H04W 92/20* (2013.01)

(56) References Cited

U.S. PATENT DOCUMENTS

2017/0235316 A1* 8/2017 Shattil .................... G05D 1/104
 701/3
2018/0092150 A1* 3/2018 Tenny ..................... H04W 4/80

OTHER PUBLICATIONS

Qualcomm Incorporated: "IAB—C-Plane Transport in L2-Relaying Architecture", 3GPP Draft; R3-181946 IAB—C-Plane Transport in L2-Relaying, 3rd Generation Partnership Project (3GPP), Mobile Competence Centre; 650, Route Des Lucioles; F-06921 Sophia-Antipolis Cedex; France, vol. RAN WG3, No. Sanya, China; Apr. 16, 2018-Apr. 20, 2018 Apr. 15, 2018, XP051430109, Retrieved from the Internet: URL:http://www.3gpp.org/ftp/Meetings%5F3GPP%5FSYNC/RAN3/Docs/ [retrieved on Apr. 15, 2018], 5 pages.

Qualcomm Incorporated: "Logical Architecture and Fronthaul Options of the New Rat", 3GPP Draft; R3-160824 New Rat Architecture, 3rd Generation Partnership Project (3GPP), Mobile Competence Centre; 650, Route Des Lucioles; F-06921 Sophia-Antipolis Cedex; France, vol. RAN WG3, No. Bangalore, India; Apr. 11, 2016-Apr. 15, 2016 Apr. 2, 2016, XP051083050, Retrieved from the Internet: URL:http://www.3gpp.org/ftp/tsg_ran/WG3_lu/TSGR3_91bis/Docs/ [retrieved on Apr. 2, 2016], 3 pages.

Samsung: "Discussions on Control Plane Protocol for IAB", 3GPP Draft; R3-181875_IAB_CP_V0.0, 3rd Generation Partnership Project (3GPP), Mobile Competence Centre; 650, Route Des Lucioles; F-06921 Sophia-Antipolis Cedex; France, vol. RAN WG3, No. Sanya, China; Apr. 16, 2018-Apr. 20, 2018 Apr. 15, 2018, XP051430040, Retrieved from the Internet: URL:http://www.3gpp.org/ftp/Meetings%5F3GPP%5FSYNC/RAN3/Docs/ [retrieved on Apr. 15, 2018], 5 pages.

* cited by examiner

TECHNIQUES FOR PROVIDING RADIO RESOURCE CONTROL AND FRONTHAUL CONTROL ON A WIRELESS FRONTHAUL LINK

CROSS REFERENCES

The present Application for Patent claims the benefit of U.S. Provisional Patent Application No. 62/543,861 by HAMPEL et al., entitled "TECHNIQUES FOR PROVIDING RADIO RESOURCE CONTROL AND FRONTHAUL CONTROL ON A WIRELESS FRONTHAUL LINK," filed Aug. 10, 2017, assigned to the assignee hereof, and which is hereby expressly incorporated by reference herein in its entirety.

BACKGROUND

The following relates generally to wireless communication, and more specifically to techniques for providing radio resource control and fronthaul control on a wireless fronthaul link.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A base station may employ a wireline link to communicate with neighboring base stations to coordinate backhaul or fronthaul transmissions. Some wireless communications systems (e.g., millimeter wave (mmW) communications systems) may deploy a large number of densely-spaced base stations. In some systems, such as systems with relatively densely spaced base stations, base stations may use wireless backhaul or fronthaul links (e.g., relay nodes) for backhaul or fronthaul communications in addition to or instead of wireline links.

SUMMARY

The described techniques relate to improved methods, systems, devices, or apparatuses that support techniques for providing radio resource control and fronthaul control on a wireless fronthaul link. Generally, the described techniques provide for transmitting different sets of control messages through a relay to a central unit (CU) and a core network of a wireless communications system. The different sets of control messages may include a first set of control messages for an access radio link between the relay and the CU and a second set of control messages for a fronthaul configuration between a distributed unit (DU) and the CU. Various techniques are disclosed for transmitting both sets of control messages using one or more radio bearers (RBs) that are established between the relay and a DU or CU.

Such techniques may include, for example, establishing one or more radio bearers, such as multiple signaling radio bearers (SRBs) or data radio bearers (DRBs) that may carry the control messages as well as access messages between a relay and a CU. In some cases, separate SRBs may be established for different sets of control messages. In some cases, a SRB may be established for a first set of control messages, and a DRB may be established for a second set of control messages. In some cases, a SRB may be established and configured with a lower portion and an upper portion, where the lower portion multiplexes a first set of control messages encapsulated in the upper portion and a second set of control messages. In still further cases, messages of the second set of messages may be encapsulated into the first set of messages and transmitted using a SRB.

A method of wireless communication is described. The method may include establishing a SRB with a CU for exchanging control messages with the CU, identifying a first set of control messages for an access radio link with the CU and a second set of control messages for a fronthaul radio link with the CU, configuring a lower portion of the SRB for transmission of at least a portion of the first set of control messages and a portion of a second set of control messages, configuring an upper portion of the SRB for transmission of at least a portion of the first set of control messages, multiplexing the upper portion of the SRB and the second set of control messages, and transmitting the multiplexed upper portion of the SRB and second set of control messages to the CU.

An apparatus for wireless communication is described. The apparatus may include means for establishing a SRB with a CU for exchanging control messages with the CU, means for identifying a first set of control messages for an access radio link with the CU and a second set of control messages for a fronthaul radio link with the CU, means for configuring a lower portion of the SRB for transmission of at least a portion of the first set of control messages and a portion of a second set of control messages, means for configuring an upper portion of the SRB for transmission of at least a portion of the first set of control messages, means for multiplexing the upper portion of the SRB and the second set of control messages, and means for transmitting the multiplexed upper portion of the SRB and second set of control messages to the CU.

Another apparatus for wireless communication is described. The apparatus may include a processor, memory in electronic communication with the processor, and instructions stored in the memory. The instructions may be operable to cause the processor to establish a SRB with a CU for exchanging control messages with the CU, identify a first set of control messages for an access radio link with the CU and a second set of control messages for a fronthaul radio link with the CU, configure a lower portion of the SRB for transmission of at least a portion of the first set of control messages and a portion of a second set of control messages, configure an upper portion of the SRB for transmission of at least a portion of the first set of control messages, multiplex the upper portion of the SRB and the second set of control messages, and transmit the multiplexed upper portion of the SRB and second set of control messages to the CU.

A non-transitory computer readable medium for wireless communication is described. The non-transitory computer-readable medium may include instructions operable to cause a processor to establish a SRB with a CU for exchanging control messages with the CU, identify a first set of control messages for an access radio link with the CU and a second set of control messages for a fronthaul radio link with the CU, configure a lower portion of the SRB for transmission of at least a portion of the first set of control messages and a portion of a second set of control messages, configure an upper portion of the SRB for transmission of at least a portion of the first set of control messages, multiplex the upper portion of the SRB and the second set of control messages, and transmit the multiplexed upper portion of the SRB and second set of control messages to the CU.

In some examples of the method, apparatus, and non-transitory computer-readable medium described above, the multiplexing further comprises setting a multiplexing field to indicate whether a lower portion of the SRB includes an upper portion of the SRB or a second set of control messages. In some examples of the method, apparatus, and non-transitory computer-readable medium described above, the lower portion of the SRB may be terminated at a DU and the upper portion of the SRB may be tunneled through the DU directly to the CU. In some examples of the method, apparatus, and non-transitory computer-readable medium described above, the configuring the upper portion of the SRB further comprises receiving a configuration for a first upper portion of the SRB and a second upper portion of the SRB, the first upper portion for radio resource control (RRC) messages for the access link and the second upper portion for control messages associated with the DU, and the first upper portion of the SRB and the second upper portion of the SRB are multiplexed with the lower portion of the SRB.

Some examples of the method, apparatus, and non-transitory computer-readable medium described above may further include processes, features, means, or instructions for establishing a second SRB with the CU. Some examples of the method, apparatus, and non-transitory computer-readable medium described above may further include processes, features, means, or instructions for receiving a configuration for the upper portion of the first SRB and the lower portion of the first SRB over the second SRB.

In some examples of the method, apparatus, and non-transitory computer-readable medium described above, a first DU supports a user equipment function (UEF) (e.g., a mobile termination function (MTF)) and exchanges the fronthaul radio messages with the CU over the lower portion of a radio bearer established between the UEF and a second DU. In some examples of the method, apparatus, and non-transitory computer-readable medium described above, the access radio link may be established between a UEF and the CU, and the first set of control messages may be exchanged between the UEF and the CU. In some examples of the method, apparatus, and non-transitory computer-readable medium described above, the second set of control messages may be fronthaul control protocol messages and the first set of control messages may be RRC protocol messages. In some examples of the method, apparatus, and non-transitory computer-readable medium described above, the first set of control messages configure the lower portion of the SRB. In some examples of the method, apparatus, and non-transitory computer-readable medium described above, the first set of control messages configure the lower portion and the upper portion of the SRB for the fronthaul radio link.

A method of wireless communication is described. The method may include establishing a SRB with a CU for exchanging control messages with the CU, identifying a first set of control messages for an access radio link with the CU and a second set of control messages for a fronthaul radio link with the CU, transmitting the first set of control messages using the SRB, encapsulating one or more of the second set of control messages into the first set of control messages, and transmitting the encapsulated first set of control messages using the SRB.

An apparatus for wireless communication is described. The apparatus may include means for establishing a SRB with a CU for exchanging control messages with the CU, means for identifying a first set of control messages for an access radio link with the CU and a second set of control messages for a fronthaul radio link with the CU, means for transmitting the first set of control messages using the SRB, means for encapsulating one or more of the second set of control messages into the first set of control messages, and means for transmitting the encapsulated first set of control messages using the SRB.

Another apparatus for wireless communication is described. The apparatus may include a processor, memory in electronic communication with the processor, and instructions stored in the memory. The instructions may be operable to cause the processor to establish a SRB with a CU for exchanging control messages with the CU, identify a first set of control messages for an access radio link with the CU and a second set of control messages for a fronthaul radio link with the CU, transmit the first set of control messages using the SRB, encapsulate one or more of the second set of control messages into the first set of control messages, and transmit the encapsulated first set of control messages using the SRB.

A non-transitory computer readable medium for wireless communication is described. The non-transitory computer-readable medium may include instructions operable to cause a processor to establish a SRB with a CU for exchanging control messages with the CU, identify a first set of control messages for an access radio link with the CU and a second set of control messages for a fronthaul radio link with the CU, transmit the first set of control messages using the SRB, encapsulate one or more of the second set of control messages into the first set of control messages, and transmit the encapsulated first set of control messages using the SRB.

Some examples of the method, apparatus, and non-transitory computer-readable medium described above may further include processes, features, means, or instructions for establishing a second SRB with the CU. Some examples of the method, apparatus, and non-transitory computer-readable medium described above may further include processes, features, means, or instructions for receiving a configuration for the first SRB over the second SRB.

In some examples of the method, apparatus, and non-transitory computer-readable medium described above, a first DU supports a UEF and exchanges the fronthaul radio messages with the CU over the lower portion of a radio bearer established between the UEF and a second DU. In some examples of the method, apparatus, and non-transitory computer-readable medium described above, the access radio link may be established between a UEF and the CU, and the first set of control messages may be exchanged between the UEF and the CU. In some examples of the method, apparatus, and non-transitory computer-readable medium described above, the second set of control messages may be fronthaul control protocol messages and the first set of control messages may be RRC protocol messages. In some examples of the method, apparatus, and non-transitory computer-readable medium described above, the first set of control messages configure a lower portion of the SRB. In some examples of the method, apparatus, and non-transitory computer-readable medium described above, the second set of control messages configure the lower portion and an upper portion of the SRB for the fronthaul radio link.

A method of wireless communication is described. The method may include identifying a first set of control messages for an access radio link with a CU and a second set of control messages for a fronthaul radio link with the CU, establishing a first RB with the CU for exchanging the first set of control messages, establishing a second RB with the CU for exchanging the second set of control messages, and transmitting the first set of control messages using the first RB and the second set of control messages using the second RB.

An apparatus for wireless communication is described. The apparatus may include means for identifying a first set of control messages for an access radio link with a CU and a second set of control messages for a fronthaul radio link with the CU, means for establishing a first RB with the CU for exchanging the first set of control messages, means for establishing a second RB with the CU for exchanging the second set of control messages, and means for transmitting the first set of control messages using the first RB and the second set of control messages using the second RB.

Another apparatus for wireless communication is described. The apparatus may include a processor, memory in electronic communication with the processor, and instructions stored in the memory. The instructions may be operable to cause the processor to identify a first set of control messages for an access radio link with a CU and a second set of control messages for a fronthaul radio link with the CU, establish a first RB with the CU for exchanging the first set of control messages, establish a second RB with the CU for exchanging the second set of control messages, and transmit the first set of control messages using the first RB and the second set of control messages using the second RB.

A non-transitory computer readable medium for wireless communication is described. The non-transitory computer-readable medium may include instructions operable to cause a processor to identify a first set of control messages for an access radio link with a CU and a second set of control messages for a fronthaul radio link with the CU, establish a first RB with the CU for exchanging the first set of control messages, establish a second RB with the CU for exchanging the second set of control messages, and transmit the first set of control messages using the first RB and the second set of control messages using the second RB.

In some examples of the method, apparatus, and non-transitory computer-readable medium described above, the first RB comprises a first SRB with the CU and the second RB comprises a second SRB with the CU.

In some examples of the method, apparatus, and non-transitory computer-readable medium described above, the first RB comprises a first SRB for exchanging RRC messages with the CU, and the second RB comprises a first data radio bearer (DRB) for exchanging fronthaul control messages with the CU. Some examples of the method, apparatus, and non-transitory computer-readable medium described above may further include processes, features, means, or instructions for establishing a second DRB with the CU for exchanging data packets with the CU.

Some examples of the method, apparatus, and non-transitory computer-readable medium described above may further include processes, features, means, or instructions for establishing a third RB with the CU. Some examples of the method, apparatus, and non-transitory computer-readable medium described above may further include processes, features, means, or instructions for receiving a configuration for the first RB and the second RB over the third RB.

In some examples of the method, apparatus, and non-transitory computer-readable medium described above, a first DU supports a UEF and exchanges the fronthaul radio messages with the CU over the lower portion of a radio bearer established between the UEF and a second DU. In some examples of the method, apparatus, and non-transitory computer-readable medium described above, the access radio link may be established between a DU and the CU, and the first set of control messages may be exchanged between the DU and the CU. In some examples of the method, apparatus, and non-transitory computer-readable medium described above, the second set of control messages may be fronthaul control protocol messages and the first set of control messages may be RRC protocol messages.

In some examples of the method, apparatus, and non-transitory computer-readable medium described above, the first set of control messages configure a lower portion of a SRB. In some examples of the method, apparatus, and non-transitory computer-readable medium described above, the second set of control messages configure the lower portion and an upper portion of the SRB for the fronthaul radio link.

DETAILED DESCRIPTION

Figure 1:
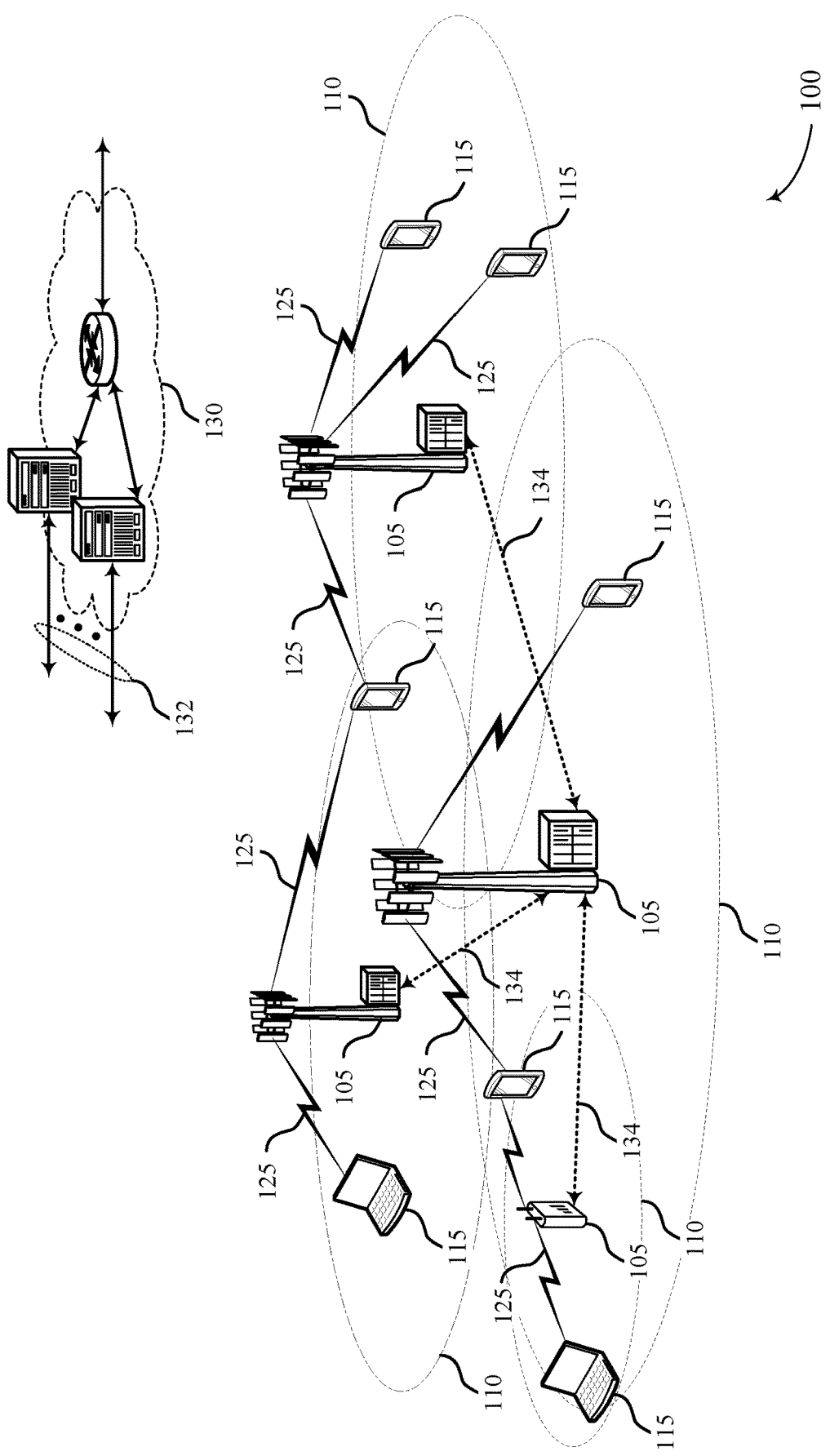
FIG. 1 illustrates an example of a system for wireless communication that supports radio resource control and fronthaul control in accordance with aspects of the present disclosure.

Various wireless communications systems as described herein may provide for transmitting different sets of control messages in systems that use self-backhauling or integrated access/backhaul (IAB) through a relay to a central unit (CU) and a core network of a wireless communications system. The different sets of control messages may include a first set of control messages for an access radio link between the relay and the CU and a second set of control messages for a fronthaul radio link between the relay and the CU. Various techniques are disclosed for transmitting both sets of control messages using one or more radio bearers (RBs) that are established between the relay and a distributed unit (DU) or CU.

Wireless communications systems may use various different techniques for communications, and in some systems, such as 5G or NR systems, directional communications (e.g., millimeter wave (mmW) transmissions) may be established between wireless nodes (e.g., a base station or a user equipment (UE)). Directional transmissions may be used to support, for example, access traffic between an access node and a UE, or backhaul traffic between access nodes. Some systems, such as relatively dense deployments of mmW base stations, may provide only a subset of the access nodes with a wireline connection, and other access nodes may have a wireless backhaul connection with one or more of the subset of the access nodes with the wireline connection, which may be referred to as self-backhauling or IAB. Self-backhauling or IAB may share wireless resources between access traffic and backhaul traffic, and may have benefits of enhancing wireless link capacity, reducing latency, reducing the cost of cell deployment, or any combination thereof. In systems with mmW base station deployments, IAB may use relatively narrow beams, which may be referred to as pencil beams, for wireless backhaul links between base stations which can help reduce inter-link interference with one or more other directional communications links in the system.

In some deployments, 5G or NR systems may use such DUs and CUs in a centralized radio access network (C-RAN) in which an access node or base station may be split into a DU, which resides at the network edge, and a CU, which resides in the cloud. The interface between DU and CU may be referred to as the F1 interface. In some cases, the CU/DU split architecture may be used for wireless multi-hop self-backhauling and IAB. For example, self-backhauling or IAB may provide benefits to deployments having densely spaced base stations, such as mmW deployments. When using a CU/DU architecture for IAB, one or more relays may relay access date, backhaul data, or combinations thereof between a UE or another relay to a CU (either directly or through another relay). Each relay may be configured with a UE-function (UEF) (e.g., a mobile termination function (MTF)) and DU function (DU-F), and may use the UEF to connect to a parent relay's DU, and use the DU-F to have UEs or child relays connect to itself. For this purpose, each relay's DU-F may establish a control plane connection (which may be referred to as a F1-C connection) with the CU, and each relay's UEF may establish a radio resource control (RRC) connection with the CU. Various aspects of the present disclosure provide techniques for a relay to multiplex or otherwise transmit these two C-plane (e.g., control plane) connections.

Such techniques may include, for example, establishing one or more radio bearers, such as multiple signaling radio bearers (SRBs) or data radio bearers (DRBs) that may carry the control messages as well as access messages between a relay and a CU. In some cases, separate SRBs may be established for different sets of control messages. In some cases, a SRB may be established for a first set of control messages, and a DRB may be established for a second set of control messages. In some cases, a SRB may be established and configured with a lower portion and an upper portion, the lower portion for transmission of at least a portion of the first set of control messages and a portion of a second set of control messages, and the upper portion for transmission of at least a portion of the first set of control messages, and the upper portion of the SRB and the second set of control messages may be multiplexed. In still further cases, messages of the second set of messages may be encapsulated into the first set of messages and transmitted using a SRB.

Aspects of the disclosure are initially described in the context of a wireless communications system. Aspects of the disclosure are further illustrated by and described with reference to apparatus diagrams, system diagrams, and flowcharts that relate to techniques for providing radio resource control and fronthaul control on a wireless fronthaul link.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, or a New Radio (NR) network. In some cases, wireless communication system 100 may support enhanced broadband communications, ultra-reliable (e.g., mission critical) communications, low latency communications, or communications with low-cost and low-complexity devices. One or more of the base stations 105 may serve as an access node that in some cases may include a CU, a DU, and a relay.

Base stations 105 may wirelessly communicate with UEs 115 or one or more other base stations 105 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). Backhaul links 134 may be wireline links or wireless links, as will be discussed in more detail below.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, a transmission/reception point (TRP), or a DU. In some configurations, various functions of each access network entity or base station 105 may be distributed across various network devices (e.g., radio heads and access network controllers or CUs and DUs) or consolidated into a single network device (e.g., a base station 105).

Wireless communication system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communication system 100 may also operate in an extremely high frequency (EHF) region of the spectrum (e.g., from 30 GHz to 300 GHz), also known as the millimeter band. In some examples, wireless communication system 100 may support mmW communications between UEs 115 and base stations 105, and EHF antennas of the respective devices may be even smaller and more closely spaced than UHF antennas. In some cases, this may facilitate use of antenna arrays within a UE 115. The propagation of EHF transmissions may be subject to even greater atmospheric attenuation and shorter range than SHF or UHF transmissions, which may lead to relatively dense deployments in systems that use mmW. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115 or another base station 105. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions.

A receiving device (e.g., a UE 115 or a base station 105, which may be an example of a mmW receiving device) may try multiple receive beams when receiving various signals, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs that can support simultaneous communications via carriers associated with more than one different carrier bandwidth.

Wireless communications systems such as an NR system may utilize any combination of licensed, shared, and unlicensed spectrum bands, among others. In some cases, flexible symbol durations and subcarrier spacing may allow for the use of carriers across multiple spectrums. In some examples, NR shared spectrum may increase spectrum utilization and spectral efficiency, specifically through dynamic vertical (e.g., across frequency) and horizontal (e.g., across time) sharing of resources.

In various examples as described herein some base stations 105 may use wireless backhauling for a backhaul link 134, and in some cases may transmit different sets of control messages associated with access links and backhaul links through a relay to a CU and core network 130. As will be discussed in more detail below, the different sets of control messages may include a first set of control messages for an access radio link between the relay and the CU and a second set of control messages for a fronthaul radio link between the relay and the CU. Various techniques are disclosed for transmitting both sets of control messages using one or more RBs that are established between the relay and a DU or CU.

Figure 2:
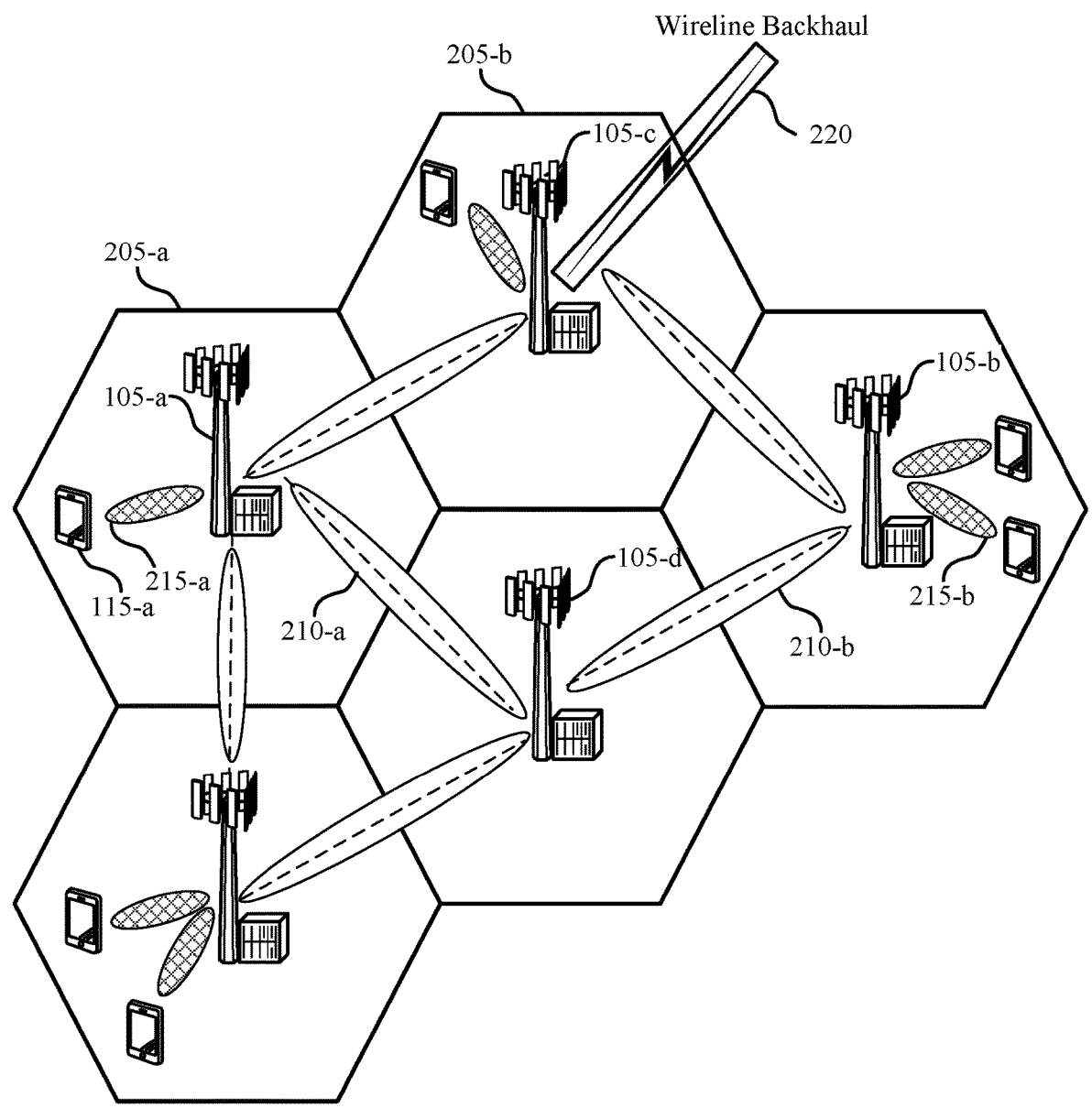
FIG. 2 illustrates an example of a wireless communication system with integrated access and backhaul that supports radio resource control and fronthaul control in accordance with aspects of the present disclosure.

FIG. 2 illustrates an example of a wireless communication system 200 with integrated access and backhaul that supports radio resource control and fronthaul control in accordance with various aspects of the present disclosure. In some examples, wireless communication system 200 may implement aspects of wireless communication system 100. Wireless communication system 200 may include a number of cells 205 that may communicate with each other over wireless links 210 via base stations 105. That is, wireless communication system 200 may include wireline backhaul link 220, in addition to several relay nodes (e.g., base stations 105) such that cells 205 may be connected via wireless links 210. Wireless links 210 (e.g., wireless backhaul links, fronthaul links, access links, etc.) may be associated with a same or different set of wireless resources (e.g., time resources, frequency resources, code resources, spatial resources, etc.). Base stations 105 may further communicate with UEs 115 via direct wireless links 215. Wireless communication system 200 may support the coordination of direct communications links between different nodes (e.g., UEs 115, base stations 105, or any combination thereof) in the wireless communication system 200, and an access node may configure such direct communications links.

In the example of FIG. 2, base stations 105 may be access nodes, and one access node, base station 105-c in this example, is supported with a wireline backhaul, such as a high capacity fiber backhaul connection to a core network. Other base stations 105 may be connected to base station 105-c with a backhaul wireless link 210. In some cases, the backhaul wireless links 210 or direct wireless links 215 may use pencil beams that use mmW directional transmissions. In some cases, base station 105-c may configure backhaul wireless links 210 between other base stations 105. For example, base station 105-*c* may configure the backhaul wireless link 210-*a* between base station 105-*a* and base station 105-*d*. In some cases, the base station 105-*c*, which may act as an access node relative to the other base stations 105, and may configure the backhaul wireless links 210 by initiating a communication link management procedure that may be used to identify, a suitable pair of transmit and receive beams that can support communication over a backhaul wireless link 210.

Wireless backhauling and fronthauling between base stations 105 may be useful in deployments having relatively high densities of base stations, such as deployments that use mmW transmissions, because such techniques enable flexible and lower cost deployments of such relatively small cells. When referring to backhauling and fronthauling, reference is made to communications between base stations, between relays and base stations, or between base stations and a core network, which may be made over backhaul links between a base station and a core network and over fronthaul links within a base station, between base stations, or between a relay and a base station. The terms backhauling and fronthauling refer generally to such communications. Furthermore, mmW transmissions are well suited for extended wireless backhaul/fronthaul networks due to their support of narrow antenna beams, which reduces inter-link interference. Accordingly, due to the limited range of mmW-based access, mmW cells are inherently small in nature which would increase deployment cost if a wireline connection were provided to each base station 105. This, coupled with the ability for mmW transmissions to have relatively narrow pencil beams with low inter-link interference, results in wireless backhauling and fronthauling being an attractive technique for such deployments. Wireless fronthauling may be performed by CUs, DUs, and relays, such as illustrated in FIGS. 3A and 3B.

Figure 3A:
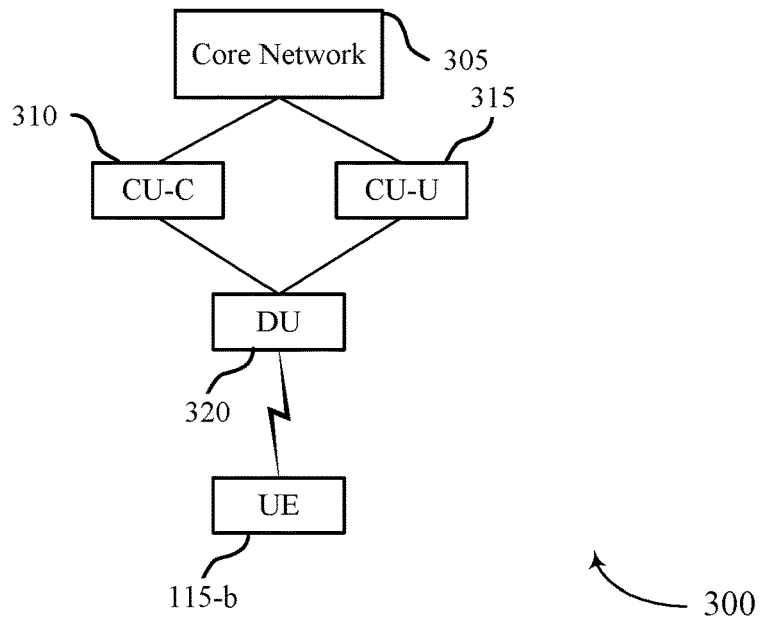
FIGS. 3A and 3B illustrate examples of network architectures that support radio resource control and fronthaul control in accordance with aspects of the present disclosure.
Figure 3B:
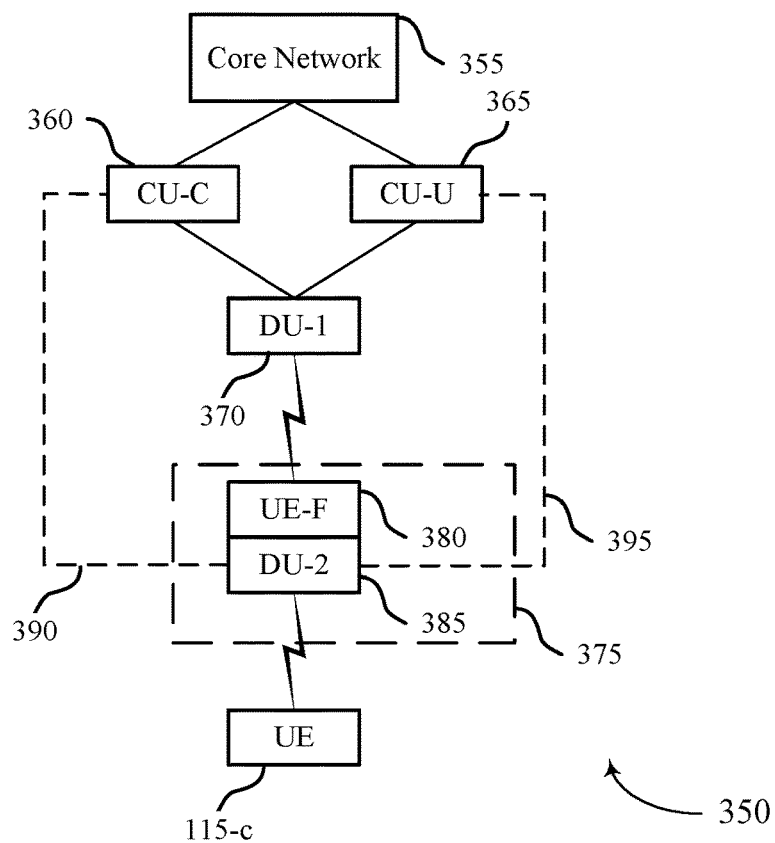

FIGS. 3A and 3B illustrate examples of network architectures 300 and 350 that support radio resource control and fronthaul control in accordance with various aspects of the present disclosure. In some examples, network architectures 300 and 350 may implement aspects of wireless communication system 100 or 200.

With respect to FIG. 3A, a CU/DU split architecture 300 is illustrated in which multiple access nodes (e.g., a base station or gNB) may be connected with a core network 305. Each access node may be split into a DU and a CU where a DU 320 resides at the network edge and supports a wireless connection to a UE 115-*b*, and the CU can be centralized and split into a control plane (CU-C) 310 and a user plane (CU-U) 315. The interface between DU 320 and CU-C 310 and CU-U 315 may be referred to as a fronthaul interface. In the CU/DU split architecture, the UE 115-*b* may connect to the DU 320 (and to CU-C 310 and CU-U 315 through the DU 320) and establish RBs such as SRBs and DRBs. Each RB may be divided into a lower portion and an upper portion, as will be discussed in more detail below with respect to FIG. 4. The CU/DU architecture sustains a signaling connection between the CU-C 310 and DU 320 referred to as F1-C. One portion of F1-C may be a fronthaul application protocol, referred to as F1-AP.

In some cases, wireless backhauling/fronthauling between access nodes may be implemented using a layer-2 relay, such as illustrated in FIG. 3B. In the example of FIG. 3B, a CU/DU split architecture 350 with a relay 375 is illustrated in which multiple access nodes (e.g., a base station or gNB) may be connected with core network 355. Each access node may have a CU/DU architecture as described above. In this example, a layer-2 (L2) relay 375 may be used to establish wireless backhauling or wireless fronthauling. The L2-relay 375 connects to an access node (e.g., a base station or a gNB) in a similar manner as a UE established a wireless connection. To implement such a UE-like connection, the relay 375 may have a UE-function (UEF) 380 (e.g., a mobile termination function (MTF)) that may be used to establish radio bearers with DU-1 370, CU-C 360, and CU-U 365, and may use these RBs to backhaul traffic between a remote UE 115-*c* that connects to the relay 375. The UE 115-*c* may connect to DU-2 385 at the relay 375. By combining the L2-relay 375 with the CU/DU architecture, wireless relaying is supported where the remote UE 115-*c* may connect to the relay 375 in the same manner as it connects to a base station. In this manner, UEs can transparently connect to either relays or base stations. Hence, relaying can be supported for legacy UEs and no additional features related to proximity services are required on the UE.

The UEF 380 may connect to an access node that includes DU-1 370, CU-U 365 and CU-C 360 using SRBs and DRBs in the same manner as discussed above with respect to FIG. 3A, and the RBs may have upper and lower portions as will be discussed in further detail below with respect to FIG. 4. As the UEF 380 provides UE-like functionality, the relay 375 may support RRC functionality to connect to the access node that includes DU-1 370, CU-U 365 and CU-C 360. RRC functionality may involve exchanging various control messages, which may be referred to as a first set of control messages, associated with RRC control of an access link of UEF 380. More specifically, the UEF 380 may use a lower portion of SRBs and DRBs to connect to DU-1 370 and an upper portion of these SRBs and DRBs to connect to the respective CU-C 360 and CU-U 365.

The relay 375 uses its DU, referred to as DU-2 385 in FIG. 3B, to support connections with UE 115-*c*, other UEs, or other UEFs (residing on other relays), and for that purpose the relay 375 supports a fronthaul control connection 390 between DU-2 385 and CU-C 360, which may be referred to as F1-C in the CU/DU split architecture. The F1-C control connection 390 may have an associated second set of control messages for fronthaul control protocol messages. A user plane connection 395 may also be supported between DU-2 385 and CU-U 365. Thus, relay 375 supports two control associations, one for RRC control, and a second for F1-C or fronthaul control. Various aspects of the present disclosure, as will be discussed in more detail below, provide techniques for multiplexing the two different sets of control messages exchanged with a relay such as relay 375.

Figure 4A:
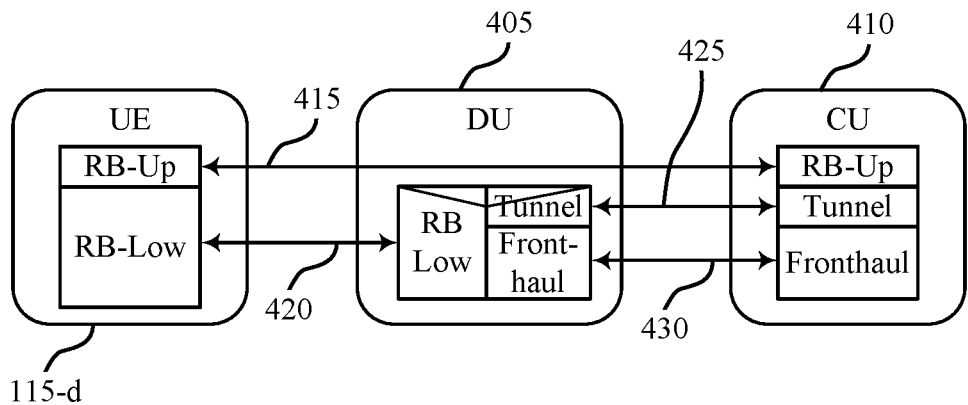
FIGS. 4A and 4B illustrate examples of distributed edge nodes and relay nodes in network architectures that support radio resource control and fronthaul control in accordance with aspects of the present disclosure.
Figure 4B:
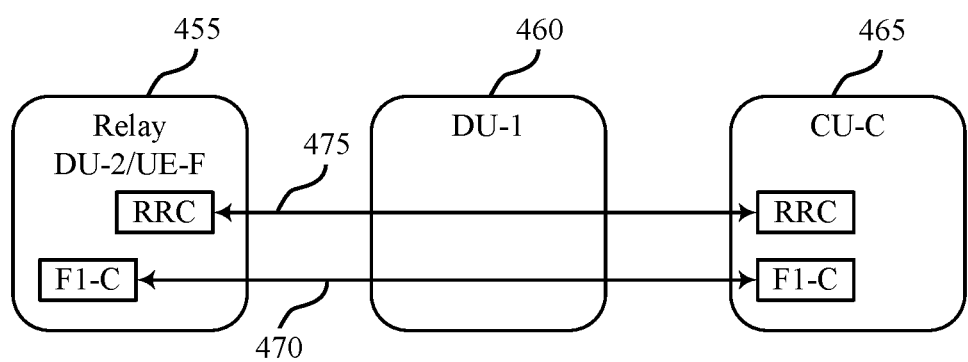

FIGS. 4A and 4B illustrate examples of distributed edge nodes and relay nodes in network architectures 400 and 450 that support radio resource control and fronthaul control in accordance with various aspects of the present disclosure. In some examples, network architectures 400 may implement aspects of wireless communication system 100 or 200.

As discussed above, RBs such as DRBs and SRBs may be established between a relay and a DU and CU. In the example of FIG. 4A, a UE 115-*d* may set up a RB between a DU 405 and a CU 410. As mentioned above, each RB may be divided into a lower portion and an upper portion, and in the example of FIG. 4A UE 115-*d* configures an upper RB portion 415 and a lower RB portion 420. The lower RB portion 420 interconnects the UE 115-*d* and the DU 405, and the upper RB portion 415 interconnects the UE 115-*d* directly with the CU 410. The lower RB portion 420 is extended from the DU 405 to the CU 410 via a tunnel 425 which runs across the fronthaul connection 430. In this manner, SRBs are routed from UE 115-*d* to a CU-C at CU 410 while DRBs are routed from UE 115-*d* to a CU-U at CU 410. The lower RB portion 420 may include physical/medium access control (PHY/MAC) and radio link control (RLC) layers, while the upper RB portion 415 may include a packet data convergence protocol (PDCP) layer. Alternatively, the lower RB portion 420 may include PHY/MAC and only a lower part of RLC layer (e.g. which only performs segmentation), while the upper RB portion 415 may include an upper part of RLC (e.g. which performs retransmissions) and a PDCP layer. Other divisions of a RB into upper and lower portions are possible.

In the example of FIG. 4B, a relay 455 may uses its DU, referred to as DU2, to have further UEs or UEFs (e.g., MTFs) (residing on relays) connect to itself, and may also use its UEF for a wireless fronthaul connection to a CU, via another DU such as a DU-1 460. For that purpose, DU-2 at relay 455 may support a control connection between DU-2 and CU-C 465, referred to as F1-C 470 in the CU/DU split architecture. A CU-C 465 at the access node and the relay 455 may thus have an RRC connection 475 and F1-C connection 470. Various aspects of the present disclosure, as will be discussed in more detail below, provide techniques for multiplexing the two different sets of control messages exchanged with a relay such as relay 455.

Figure 5:
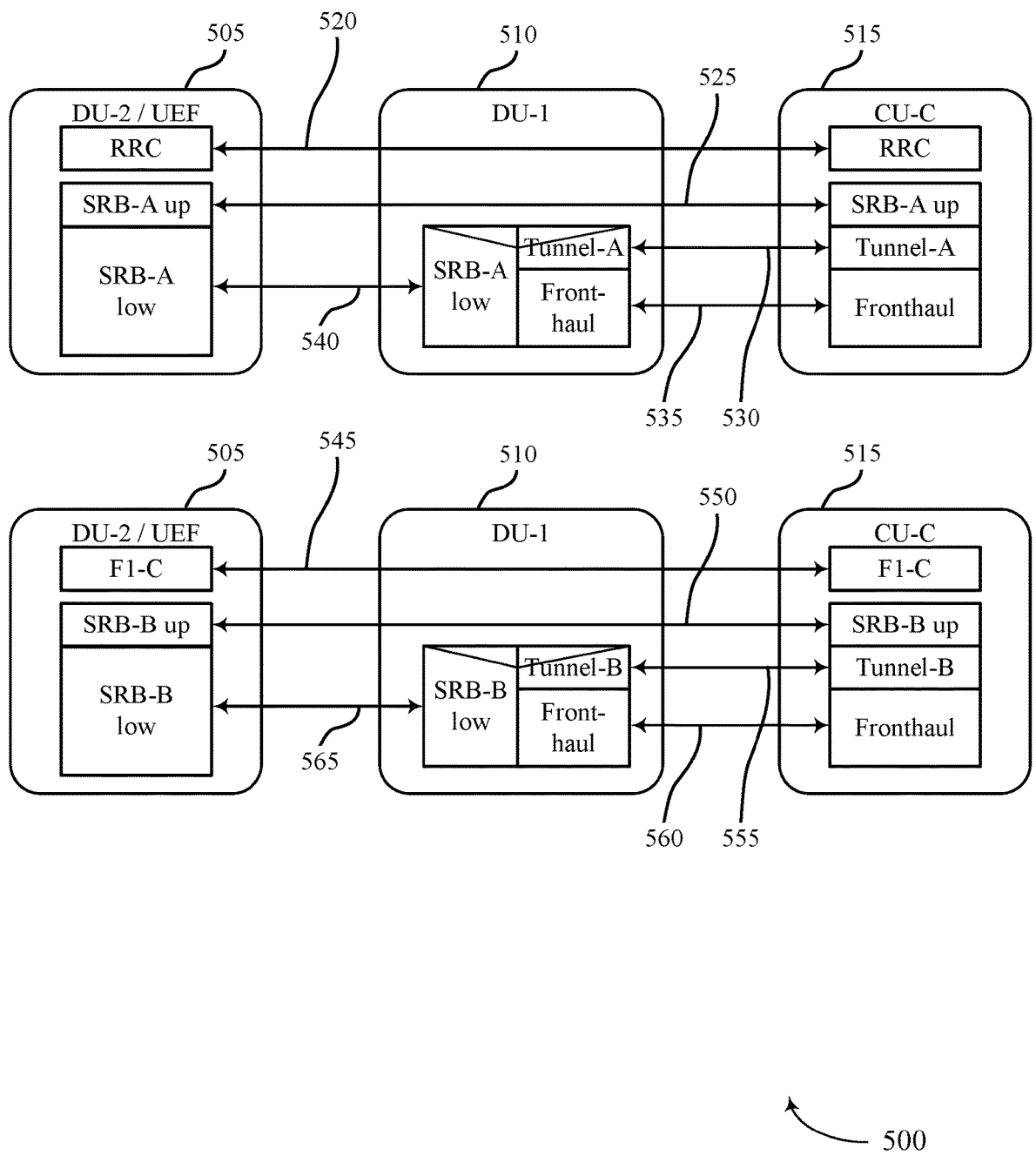
FIG. 5 through 9 illustrate examples of network node configurations that support radio resource control and fronthaul control in accordance with aspects of the present disclosure.

FIG. 5 illustrates an example of a network node configuration 500 that supports radio resource control and fronthaul control in accordance with various aspects of the present disclosure. In some examples, network node configuration 500 may implement aspects of wireless communication system 100 or 200.

In the example of FIG. 5, a relay 505 may contain a DU-2/UEF (e.g., an MTF), and may establish connections with another DU, namely DU-1 510, and a CU-C 515. In this example, the UEF on the relay 505 may establish an RRC connection 520 to the CU-C 515 over a first SRB, referred to as SRB-A in FIG. 5. The first SRB may have an upper portion 525 and a lower portion 540 is extended from DU-1 505 to the CU-C 515 via tunnel-A 530 which runs across the fronthaul connection 535. In this example, RRC protocol control messages may be exchanged with CU-C 515 via the first SRB. In this example, the CU-C 515 configures a second SRB, referred to as SRB-B, for an F1-C connection 545. The second SRB may have an upper portion 550 and a lower portion 565 is extended from DU-1 505 to the CU-C 515 via tunnel-B 555 which runs across the fronthaul connection 560. In this example, F1-C protocol control messages may be exchanged with CU-C 515 via the second SRB.

Each of the first SRB and the second SRB may be specified by a cell radio network temporary identifier (C-RNTI) and a logic channel identifier (LCD). SRB-A and SRB-B may be differentiated by the LCID, for instance. Thus, in this example, a first set of control messages may be carried by the first SRB, and a second set of control messages may be carried by the second SRB, and thus both sets of control messages may be exchanged with the relay 505.

Figure 6:
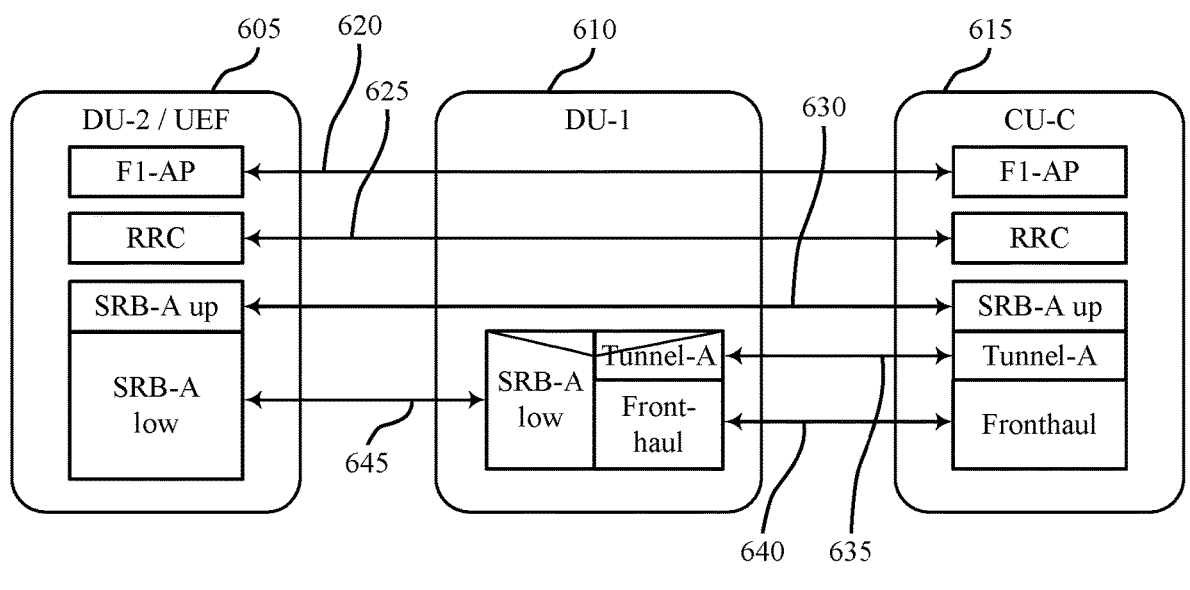

FIG. 6 illustrates an example of a network node configuration 600 that supports radio resource control and fronthaul control in accordance with various aspects of the present disclosure. In some examples, network node configuration 600 may implement aspects of wireless communication system 100.

In the example of FIG. 6, a relay 605 may contain a DU-2/UEF (e.g., an MTF), and may establish connections with another DU, namely DU-1 610, and a CU-C 615. In this example, the UEF on the relay 605 may establish an RRC connection 625 to the CU-C 615 over a first SRB, referred to as SRB-A in FIG. 6. The first SRB may have an upper portion 630 and a lower portion 645 is extended from DU-1 605 to the CU-C 615 via tunnel-A 635 which runs across the fronthaul connection 640. In this example, RRC protocol control messages may be exchanged with CU-C 615 via the first SRB. In this example, DU-2 at the relay 605 and CU-C may then exchange F1-C messages 620 over RRC by encapsulating F1-C messages into an RRC container. Such a container may contain the F1-C control messages may be flagged appropriately such that the DU and CU can recognize the messages. The F1-C messages 620 may refer to an F1 Application Protocol (F1-AP) at DU-1 on relay 605 and on CU-C 615. Thus, in this example, a first set of control messages may be carried by the first SRB, and a second set of control messages may be encapsulated within the first set of control messages and also be carried by the first SRB, and thus both sets of control messages may be exchanged with the relay 605.

Figure 7:
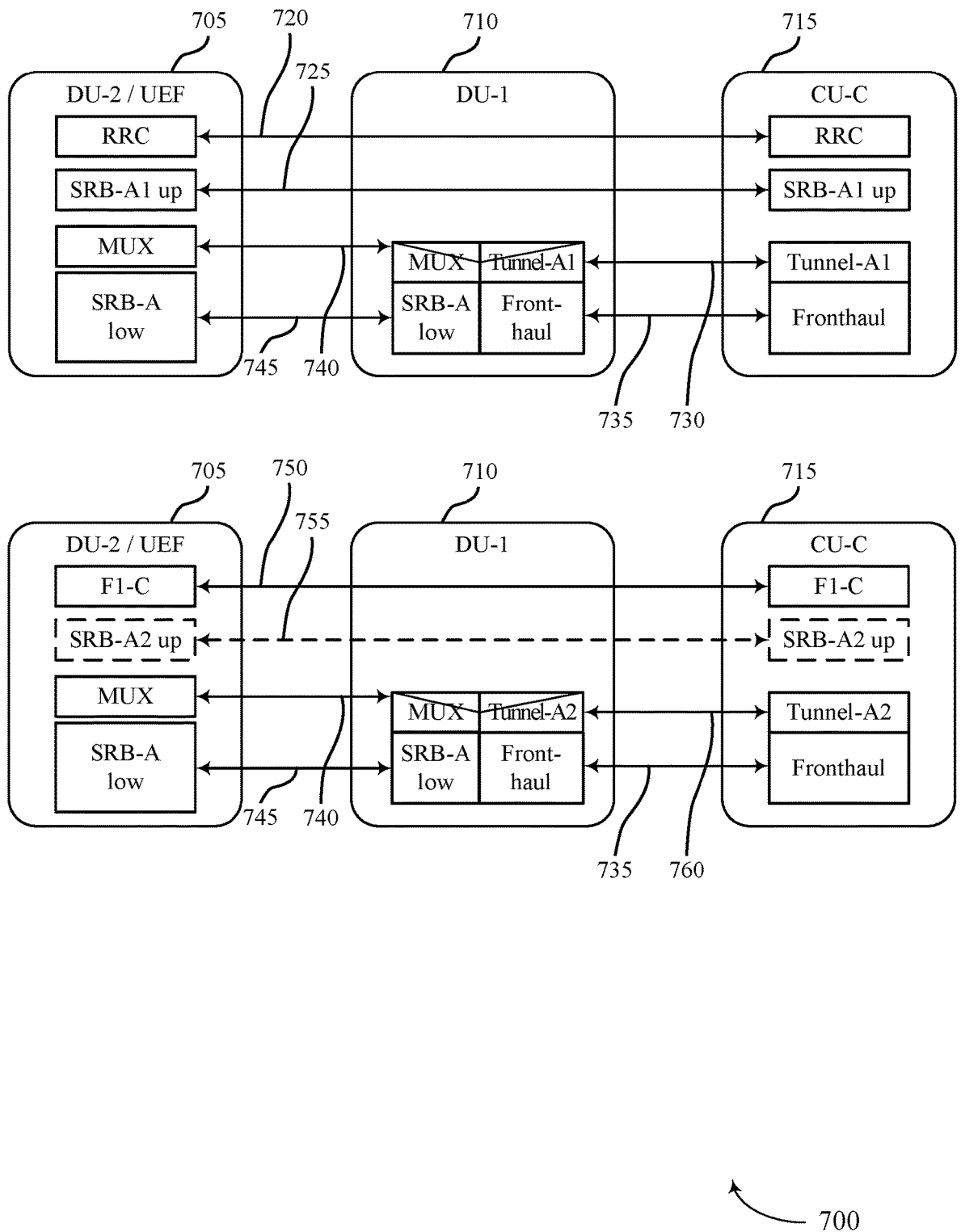

FIG. 7 illustrates an example of a network node configuration 700 that supports radio resource control and fronthaul control in accordance with various aspects of the present disclosure. In some examples, network node configuration 700 may implement aspects of wireless communication system 100.

In the example of FIG. 7, a relay 705 may contain a DU-2/UEF (e.g., an MTF), and may establish connections with another DU, namely DU-1 710, and a CU-C 715. In this example, the UEF on the relay 705 may establish an RRC connection for exchanging RRC messages 720 with the CU-C 715 over a first SRB, referred to as SRB-A in FIG. 7. The first SRB may have a first upper portion 725, referred to as SRB-A1-up, a second upper portion 755 referred to as SRB-A2-up, and a lower portion 745 referred to as SRB-A-low, which is extended from DU-1 705 to the CU-C 715 via tunnel-A1 730 and tunnel-A2 760 which run across the fronthaul connection 735. In this example, RRC protocol control messages may be exchanged with CU-C 715 via SRB-A1-up.

In this example, a multiplexing (MUX) layer 740 is inserted between lower portion 745 and upper portions 725 and 755 of the SRB-A. This layer multiplexes between RRC messages 720 and DU F1-C control messages 750, and may be carried between relay 705 and DU-1 710. RRC messages 720 and DU F1-C control messages 750 share the same lower portion 745 of SRB-A. RRC messages 720 may be supported by the first SRB upper portion 725 (SRB-A1). DU F1-C control messages 750 may run natively on the MUX layer 740 or they run on the second SRB upper portion 755 (SRB-A2). The DU1/CU-C supports independent tunnels, referred to as Tunnel-A1 and Tunnel-A2, on the fronthaul. Thus, in this example, both a first set of control messages and a second set of control messages may be carried by the first SRB-A-low through multiplexing of the DU F1-C control messages 750 with the upper portion of SRB-A1-up that carries RRC messages 720, and thus both sets of control messages may be exchanged with the relay 705.

Figure 8:
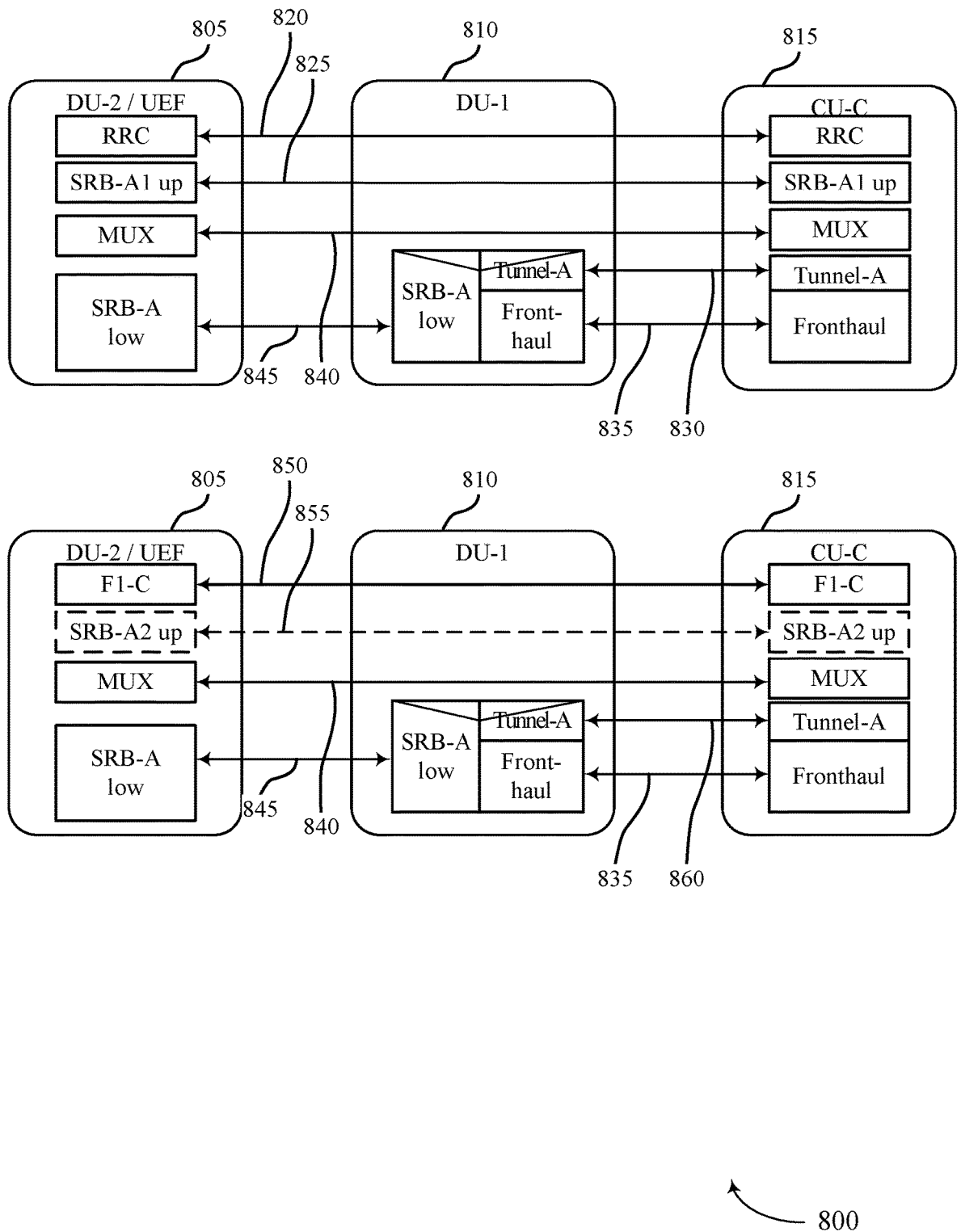

FIG. 8 illustrates an example of a network node configuration 800 that supports radio resource control and fronthaul control in accordance with various aspects of the present disclosure. In some examples, network node configuration 800 may implement aspects of wireless communication system 100.

In the example of FIG. 8, multiplexing may be used to multiplex F1-C control messages 850 with an upper portion of the SRB that carries RRC messages 820, similarly as described in FIG. 7, and MUX layer 840 stretches from the relay 805 to the CU-C 815. Thus, only one tunnel, referred to as Tunnel-A, is needed on the fronthaul. Remaining aspects of FIG. 7 are the same, and a relay 805 may contain a DU-2/UEF (e.g., an MTF), and may establish connections with another DU, namely DU-1 810, and a CU-C 815. In this example, the UEF on the relay 805 may establish an RRC connection 820 to the CU-C 815 over a first SRB, referred to as SRB-A in FIG. 8. The first SRB may have a first upper portion 825, referred to as SRB-A1, a second upper portion 855 referred to as SRB-A2, and a lower portion 845 is extended from DU-1 805 to the CU-C 815 via tunnel-A1 830 and tunnel A2 860 which run across the fronthaul connection 835. In this example, RRC protocol control messages may be exchanged with CU-C 815 via the first SRB.

As mentioned, the MUX layer 840 stretches from the relay 805 to the CU-C 815, and is inserted between lower portion SRB-A 845, which is extended by Tunnel-A 860 between DU-1 and CU-C, and upper portions SRB-A1-up 825 and SRB-A2-up 855. This layer multiplexes between RRC messages 820 and DU F1-C control messages 850, and may be carried between relay 805 and CU-C 815. RRC messages 820 and DU F1-C control messages 850 share the same lower portion 845 of SRB-A. RRC messages 820 may be supported by the first SRB upper portion 825 (SRB-A1). DU F1-C control messages 850 may or may not be supported by the second SRB upper portion 855 (SRB-A2). As the MUX layer 840 stretches across DU-1 810, a single tunnel, referred to as Tunnel-A 860, may be used on the fronthaul. Thus, in this example, both a first set of control messages and a second set of control messages may be carried by the first SRB through multiplexing of the DU F1-C control messages 850 with the upper portion of the SRB that carries RRC messages 820, and thus both sets of control messages may be exchanged with the relay 805.

Figure 9:
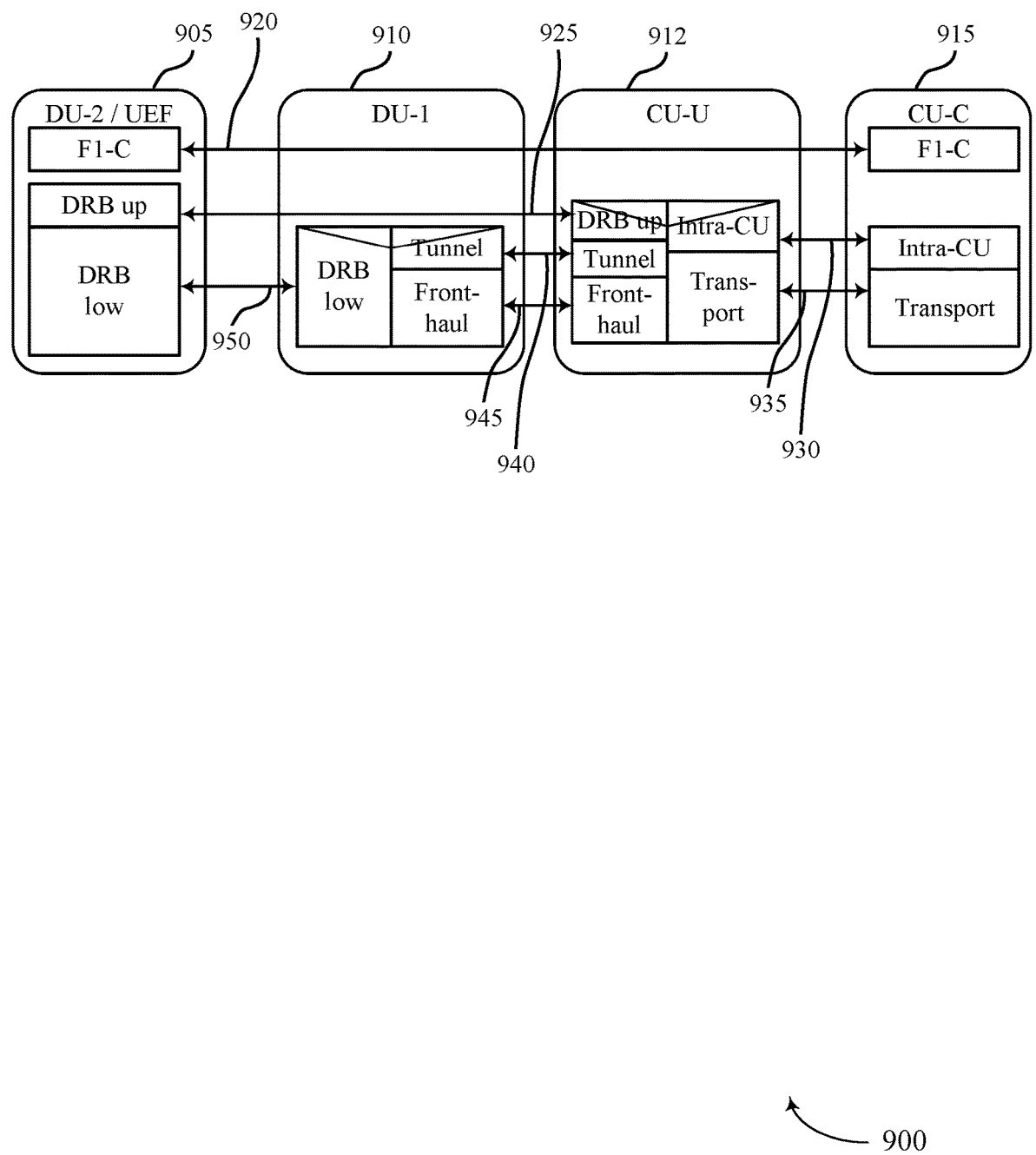

FIG. 9 illustrates an example of a network node configuration 900 that supports radio resource control and fronthaul control in accordance with various aspects of the present disclosure. In some examples, network node configuration 900 may implement aspects of wireless communication system 100.

In the example of FIG. 9, F1-C messages 920 may be carried on a dedicated DRB between relay 905 and CU-C 915 and encapsulated in an intra-CU control channel 930 between CU-U 912 and CU-C 915. Other architecture portions are similar as discussed above with respect to FIGS. 5-8, and a relay 905 may contain a DU-2/UEF (e.g., an MTF), and may establish connections with another DU, namely DU-1 910, CU-U 912, and CU-C 915. In this example, the UEF on the relay 905 may establish a DRB with CU-U 912 that has an upper portion 925 and a lower portion 950 is extended from DU-1 905 to the CU-U 912 via tunnel 940 which runs across the fronthaul connection 945. As mentioned above, in this example, F1-C messages 920 may be carried on a dedicated DRB between relay 905 and CU-C 915 and encapsulated in an intra-CU control channel 930 between CU-U 912 and CU-C 915. A transport connection 935 may be established between CU-U 912 and CU-C 915. RRC protocol control messages may be exchanged with CU-C 915 via a first SRB, in a similar manner as discussed above with respect to FIGS. 5 and 6. Thus, in this example, a first set of control messages may be carried by the SRB, and a second set of control messages may be carried by the DRB, and thus both sets of control messages may be exchanged with the relay 505.

Figure 10:
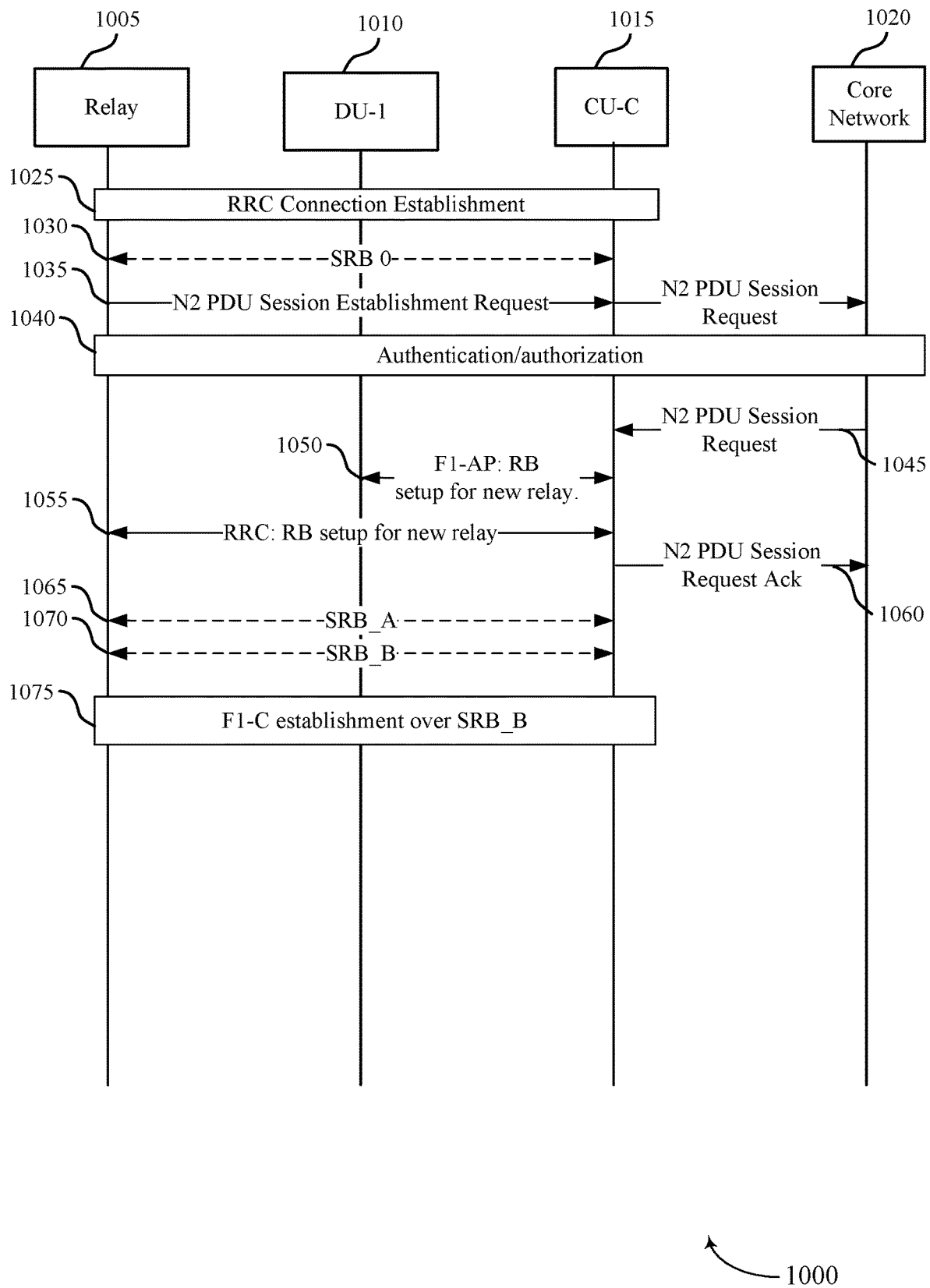
FIGS. 10 through 14 illustrate example of process flows that support radio resource control and fronthaul control in accordance with aspects of the present disclosure.

FIG. 10 illustrates an example of a process flow 1000 that supports radio resource control and fronthaul control in accordance with various aspects of the present disclosure. In some examples, process flow 1000 may implement aspects of wireless communication system 100 or 200. Process flow 1000 may include a relay 1005, a DU-1 1010, a CU-C 1015, and a core network 1020, which may each be examples of the corresponding devices such as described with reference to FIGS. 1-9. In this example, multiple SRBs may be established as discussed above in the example of FIG. 5.

In this example, at block 1025, a UEF (e.g., an MTF) at the relay 1005 may establish an RRC connection with CU-C 1015 via DU-1 1010. The relay 1005 may establish an initial SRB, referred to as SRB0 1030, and may provide an indicator that informs the CU-C 1015 that the relay 1005 has relay functionality.

The UEF at the relay 1005 may send a non-access stratum (NAS) N2 protocol data unit (PDU) Session Establishment Request 1035 to the core network 1020 via the CU-C 1015. Between the relay 1005 and CU-C 1015, this NAS message may be encapsulated in RRC.

At block 1040, NAS over RRC, the relay 1005 may perform authentication/authorization with the core network 1020. The core network 1020 may transmit a PDU Session Request message 1045 to the CU-C 1015. Responsive thereto, the CU-C 1015 may send an F1-AP configuration message 1050 to DU-1 1010 to establish the lower portions of SRB-A and SRB-B and the corresponding tunnels, Tunnel-A and Tunnel-B, as described above with respect to FIG. 5. The CU-C 1015 itself establishes the other end points of Tunnel-A and Tunnel-B and the respective upper portion of SRB-A and SRB-B on top.

The CU-C 1015 may then send an RRC configuration message 1055 to the relay 1005 to establish the lower and the upper portion of SRB-A 1065 and SRB-B 1070. The CU-C 1015 may send a PDU Session Request Ack message 1060 to the core network 1020.

The relay 1005 may then launch DU-2, as illustrated in FIG. 5, and at block 1075 may establish F1-C and exchange F1-C messages with the CU-C 1015 via SRB-B 1070, and exchange RRC messages with CU-C via SRB-A 1065.

Figure 11:
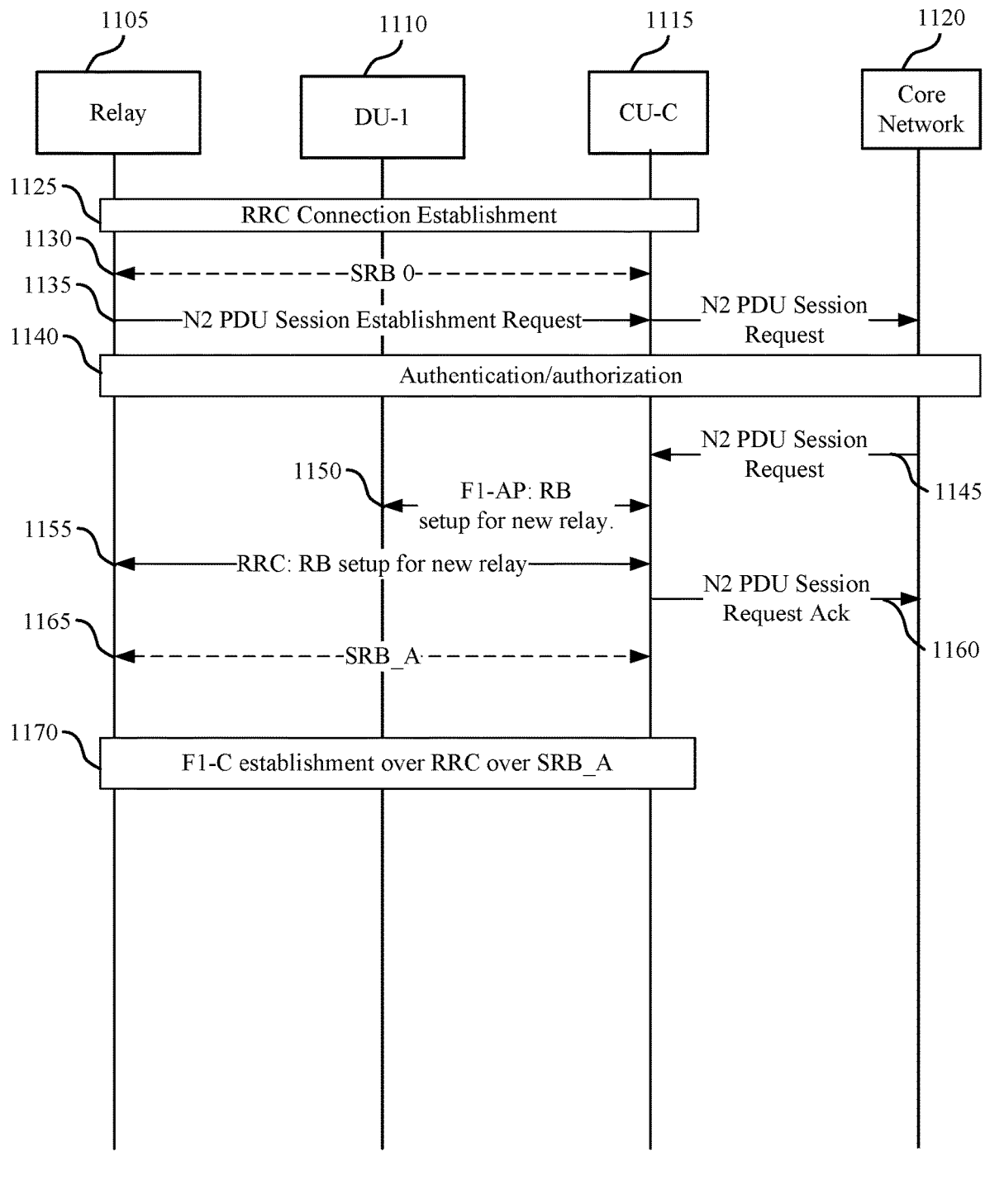

FIG. 11 illustrates an example of a process flow 1100 that supports radio resource control and fronthaul control in accordance with various aspects of the present disclosure. In some examples, process flow 1100 may implement aspects of wireless communication system 100 or 200. Process flow 1100 may include a relay 1105, a DU-1 1110, a CU-C 1115, and a core network 1120, which may each be examples of the corresponding devices such as described with reference to FIGS. 1-9. In this example, F1-C control messages may be encapsulated in RRC messages, as discussed above in the example of FIG. 6.

In this example, at block 1125, a UEF (e.g., an MTF) at the relay 1105 may establish an RRC connection with CU-C 1115 via DU-1 1110. The relay 1105 may establish an initial SRB, referred to as SRB0 1130, and may provide an indicator that informs the CU-C 1115 that the relay 1105 has relay functionality.

The UEF at the relay 1105 may send a NAS N2 PDU Session Establishment Request 1135 to the core network 1120 via the CU-C 1115. Between the relay 1105 and CU-C 1115, this NAS message may be encapsulated in RRC.

At block 1140, NAS over RRC, the relay 1105 may perform authentication/authorization with the core network 1120. The core network 1120 may transmit a PDU Session Request message 1145 to the CU-C 1115. Responsive thereto, the CU-C 1115 may send an F1-AP configuration message 1150 to DU-1 1110 to establish the lower portion of SRB-A 1165 and the corresponding tunnel, Tunnel-A. The CU-C 1115 itself establishes the other end point of Tunnel-A as well as the corresponding upper portion of SRB-A 1165.

The CU-C 1115 may then send an RRC configuration message 1155 to the relay 1105 to establish the lower and the upper portion of SRB-A. The CU-C 1115 may send a PDU Session Request Ack message 1160 to the core network 1120.

The relay 1105 may then launch DU-2, as illustrated in FIG. 6, and at block 1170 may establish F1-C and exchange encapsulated F1-C messages with the CU-C 1115 over RRC messages.

Figure 12:
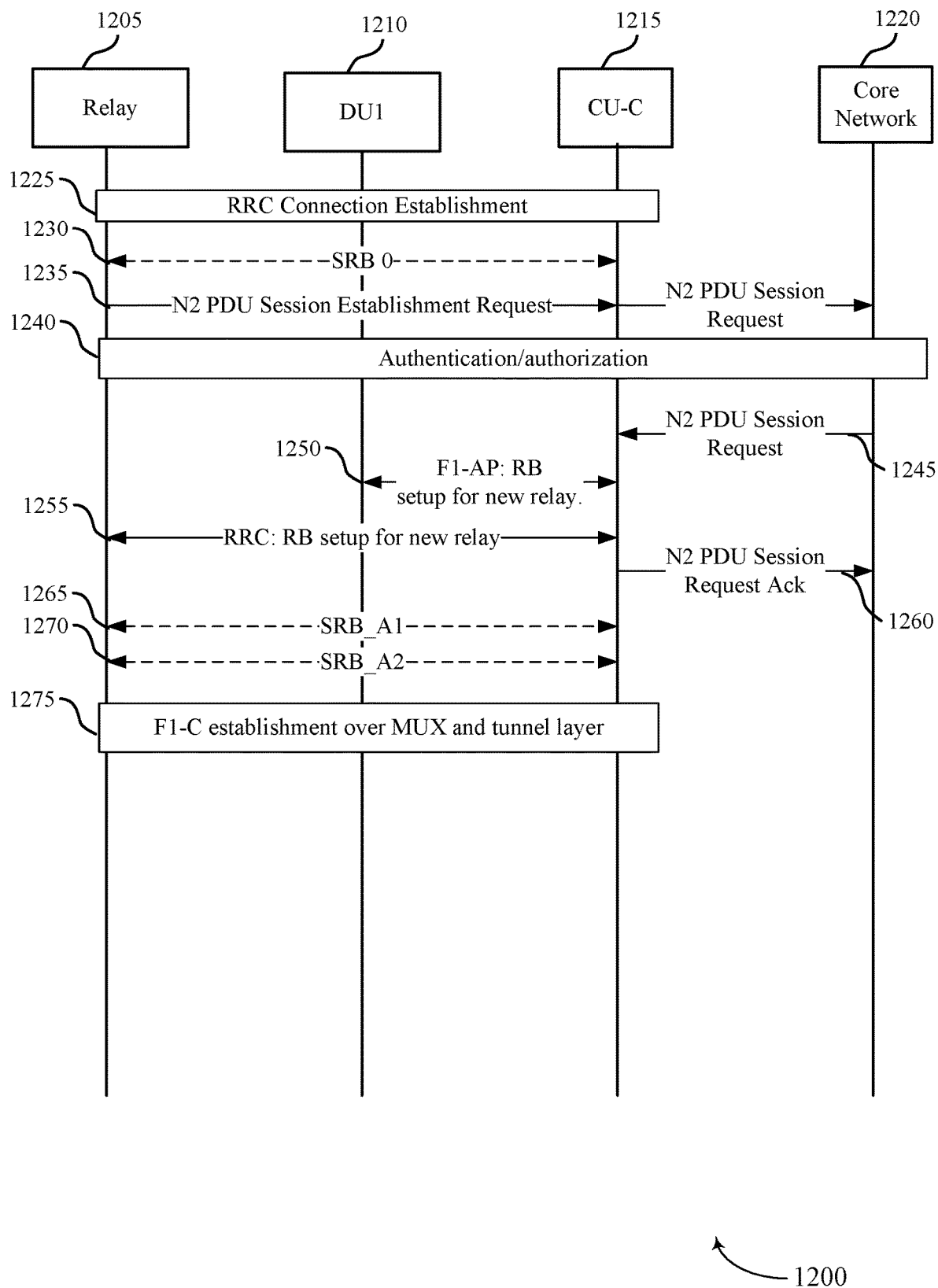

FIG. 12 illustrates an example of a process flow 1200 that supports radio resource control and fronthaul control in accordance with various aspects of the present disclosure. In some examples, process flow 1200 may implement aspects of wireless communication system 100 or 200. Process flow 1200 may include a relay 1205, a DU-1 1210, a CU-C 1215, and a core network 1220, which may each be examples of the corresponding devices such as described with reference to FIGS. 1-9. In this example, multiplexing may be used to multiplex F1-C messages and an upper portion of an SRB as discussed above in the example of FIG. 7.

In this example, at block 1225, a UEF (e.g., an MTF) at the relay 1205 may establish an RRC connection with CU-C 1215 via DU-1 1210. The relay 1205 may establish an initial SRB, referred to as SRB0 1230, and may provide an indicator that informs the CU-C 1215 that the relay 1205 has relay functionality.

The UEF at the relay 1205 may send a NAS N2 PDU Session Establishment Request 1235 to the core network 1220 via the CU-C 1215. Between the relay 1205 and CU-C 1215, this NAS message may be encapsulated in RRC.

At block 1240, NAS over RRC, the relay 1205 may perform authentication/authorization with the core network 1220. The core network 1220 may transmit a PDU Session Request message 1245 to the CU-C 1215. Responsive thereto, the CU-C 1215 may send an F1-AP configuration message 1250 to DU-1 1210 to establish the lower portion of SRB-A, which is shared between the upper portions, SRB-A1 1265 and SRB-A2 1270, and the extending tunnels, Tunnel-A1 and Tunnel-A2. The CU-C 1215 itself establishes the other end points of Tunnel-A1 and Tunnel-A2 as well as the corresponding upper SRB portions, namely SRB-A1 1265 and SRB-A2 1270.

The CU-C 1215 may then send an RRC configuration message 1255 to the relay 1205 to establish the lower portion of SRB-A, which is shared between the upper portions, SRB-A1 1265 and SRB-A2 1270. The CU-C 1215 may send a PDU Session Request Ack message 1260 to the core network 1220.

The relay 1205 may then launch DU-2, as illustrated in FIG. 7, and at block 1275 may establish F1-C and exchange F1-C messages with the CU-C 1215 via SRB-A2 1270. The relay 1205 may exchange RRC messages with the CU-C 1215 over SRB-A1 1265. The relay 1205 and DU-1 1210 may multiplex SRB-A1 1265 and SRB-A2 1270 messages onto the lower portion SRB-A via the MUX layer as described in FIG. 7.

Figure 13:
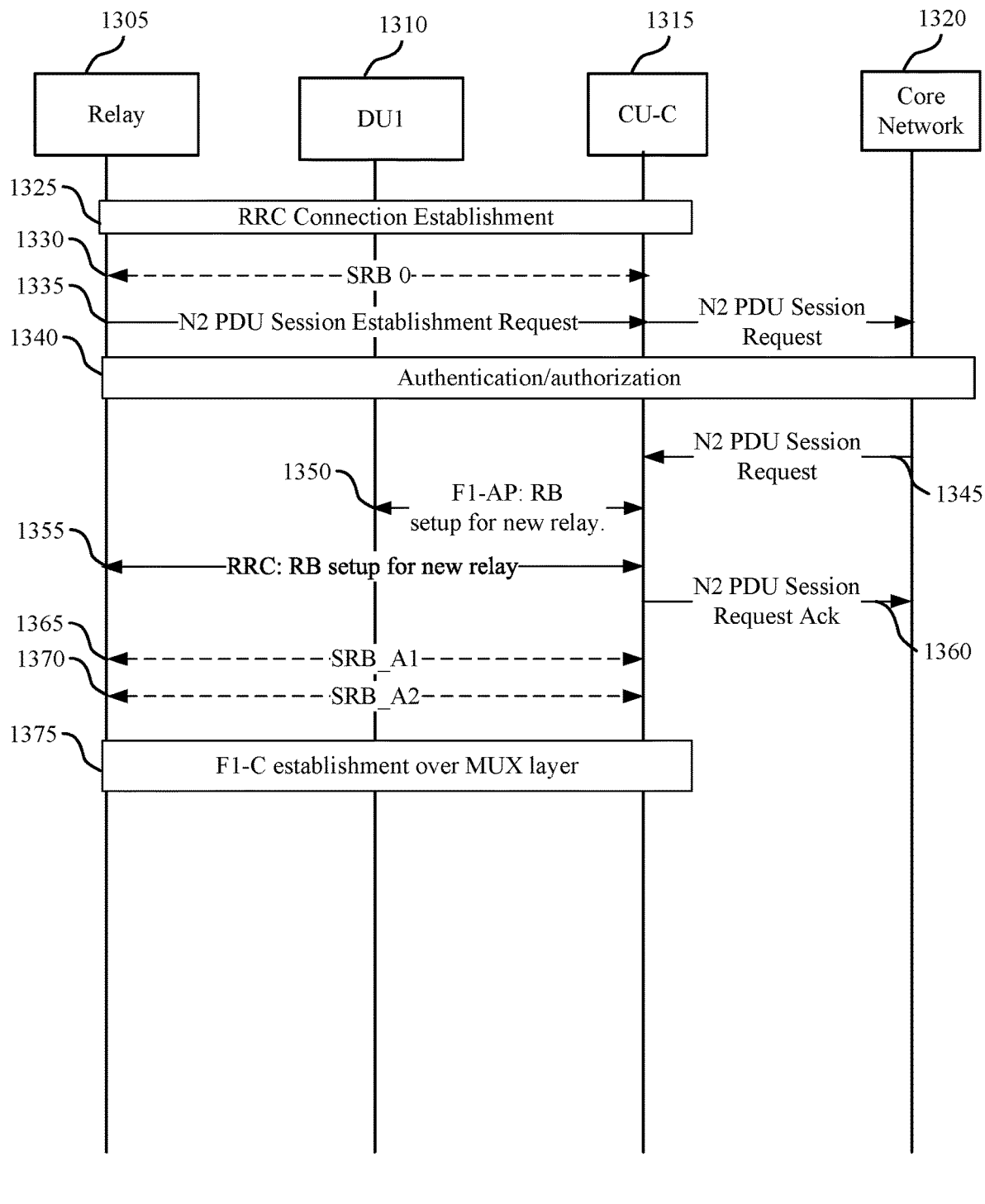

FIG. 13 illustrates an example of a process flow 1300 that supports radio resource control and fronthaul control in accordance with various aspects of the present disclosure. In some examples, process flow 1300 may implement aspects of wireless communication system 100 or 200. Process flow 1300 may include a relay 1305, a DU-1 1310, a CU-C 1315, and a core network 1320, which may each be examples of the corresponding devices such as described with reference to FIGS. 1-9. In this example, multiplexing may be used to multiplex F1-C messages and an upper portion of an SRB as discussed above in the example of FIG. 8.

In this example, at block 1325, a UEF (e.g., an MTF) at the relay 1305 may establish an RRC connection with CU-C 1315 via DU-1 1310. The relay 1305 may establish an initial SRB, referred to as SRB0 1330, and may provide an indicator that informs the CU-C 1315 that the relay 1305 has relay functionality.

The UEF at the relay 1305 may send a NAS N2 PDU Session Establishment Request 1335 to the core network 1320 via the CU-C 1315. Between the relay 1305 and CU-C 1315, this NAS message may be encapsulated in RRC.

At block 1340, NAS over RRC, the relay 1305 may perform authentication/authorization with the core network 1320. The core network 1320 may transmit a PDU Session Request message 1345 to the CU-C 1215. Responsive thereto, the CU-C 1315 may send an F1-AP configuration message 1350 to DU-1 1210 to establish the lower portion of SRB-A and an extending tunnel, Tunnel-A, as well as the upper portions, SRB-A1 1365 and SRB-A2 1370, which share the lower portion SRB-A and Tunnel-A. The CU-C 1215 itself establishes the other end point of Tunnel-A as well as the corresponding upper SRB portions, namely SRB-A1 1365 and SRB-A2 1370.

The CU-C 1315 may then send an RRC configuration message 1355 to the relay 1305 to establish the lower portion of SRB-A, which is shared between the upper portions, SRB-A1 1365 and SRB-A2 1370. The CU-C 1315 may send a PDU Session Request Ack message 1360 to the core network 1320.

The relay 1305 may then launch DU-2, as illustrated in FIG. 8, and at block 1375 may establish F1-C and exchange F1-C messages with the CU-C 1315 via SRB-A2 1370. The relay 1305 may exchange RRC messages with the CU-C 1315 over SRB-A1 1365. The relay 1305 and DU-1 1310 may multiplex SRB-A1 1365 and SRB-A2 1370 messages onto the lower portion SRB-A via the MUX layer as described in FIG. 8.

Figure 14:
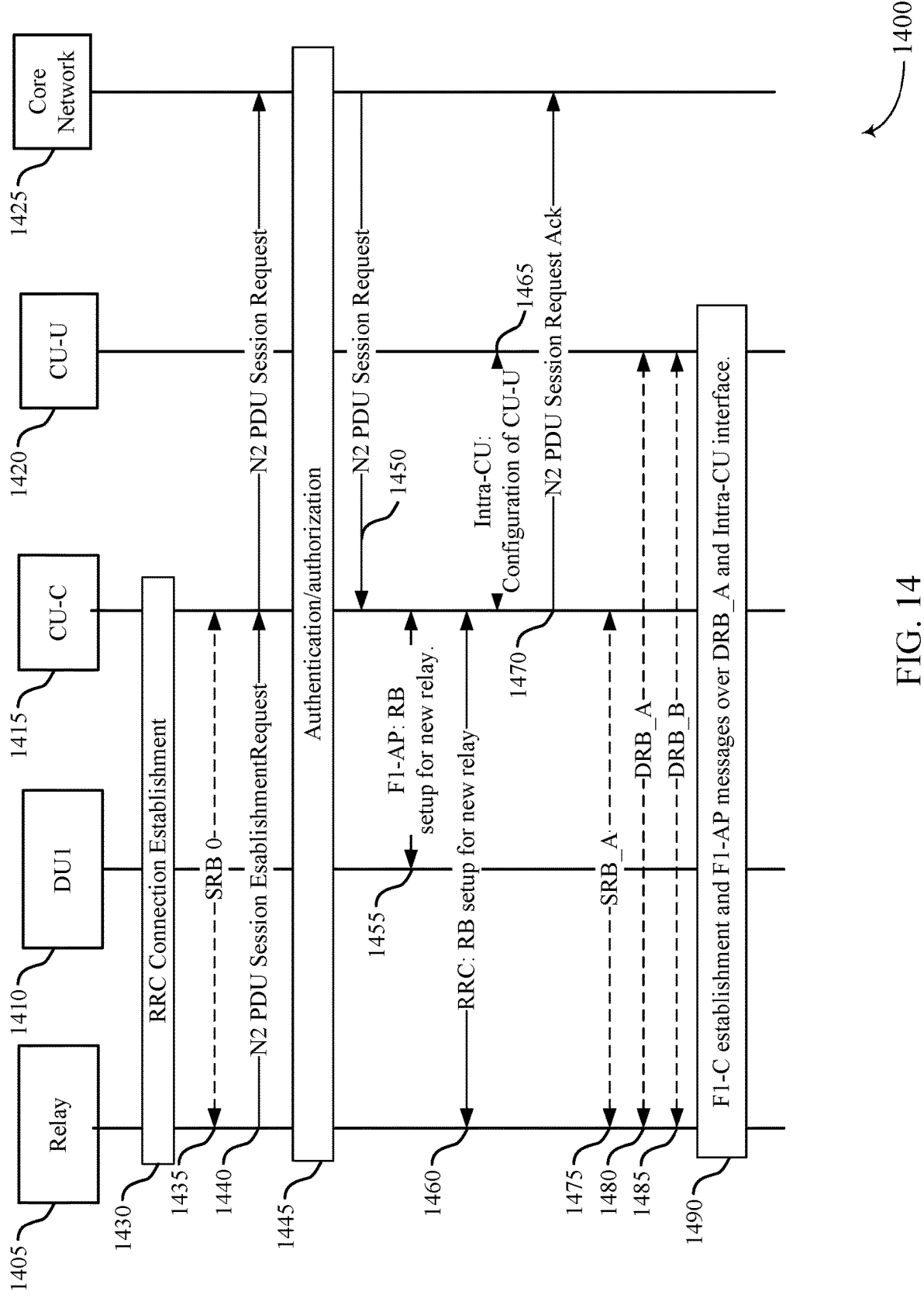

FIG. 14 illustrates an example of a process flow 1400 that supports radio resource control and fronthaul control in accordance with various aspects of the present disclosure. In some examples, process flow 1400 may implement aspects of wireless communication system 100 or 200. Process flow 1400 may include a relay 1405, a DU-1 1410, a CU-C 1415, a CU-U 1420, and a core network 1425, which may each be examples of the corresponding devices such as described with reference to FIGS. 1-9. In this example, a DRB may be used for F1-C messages and an SRB may be used for RRC messages as discussed above in the example of FIG. 9.

In this example, at block 1430, a UEF (e.g., an MTF) at the relay 1405 may establish an RRC connection with CU-C 1415 via DU-1 1410. The relay 1405 may establish an initial SRB, referred to as SRB0 1435, and may provide an indicator that informs the CU-C 1415 that the relay 1405 has relay functionality.

The UEF at the relay 1405 may send a NAS N2 PDU Session Establishment Request 1440 to the core network 1425 via the CU-C 1415. Between the relay 1405 and CU-C 1415, this NAS message may be encapsulated in RRC.

At block 1445, NAS over RRC, the relay 1405 may perform authentication/authorization with the core network 1425. The core network 1425 may transmit a PDU Session Request message 1450 to the CU-C 1415. Responsive thereto, the CU-C 1415 may send an F1-AP configuration message 1455 to the DU-1 1410 to establish the lower portions of SRB-A 1475, DRB-A 1480 and DRB-B 1485 and the corresponding tunnels, Tunnel-SA, Tunnel-DA and Tunnel-DB. The CU-C 1415 itself establishes the other end points of Tunnel-SA.

The CU-C 1415 may then send an RRC configuration message 1460 to the relay 1405 to establish the lower and the upper portion of SRB-A 1475, DRB-A 1480 and DRB-B 1485.

The CU-C 1415 may uses an Intra-CU control channel 1465 to configure on the CU-U 1420 the tunnel end points, Tunnel-DA and Tunnel-DB and the respective upper portion of DRB-A 1480 and DRB-B 1485 on top. The CU-C 1415 may send a PDU Session Request Ack message 1470 to the core network 1425.

The relay 1405 may then launch DU-2, as illustrated in FIG. 9, and at block 1490 may establish F1-C and exchange F1-C messages with the CU-U 1420 via CU-C 1415, where the messages are carried on one of the DRBs between Relay 1405 and CU-C 1415 and encapsulated on the Intra-CU control channel between CU-U 1420 and CU-C 1415. The relay 1405 exchanges RRC messages with CU-C 1415 via SRB-A 1475. The RRC and F1-C messages may be transmitted using the different RBs, as described in FIG. 9.

Figure 15:
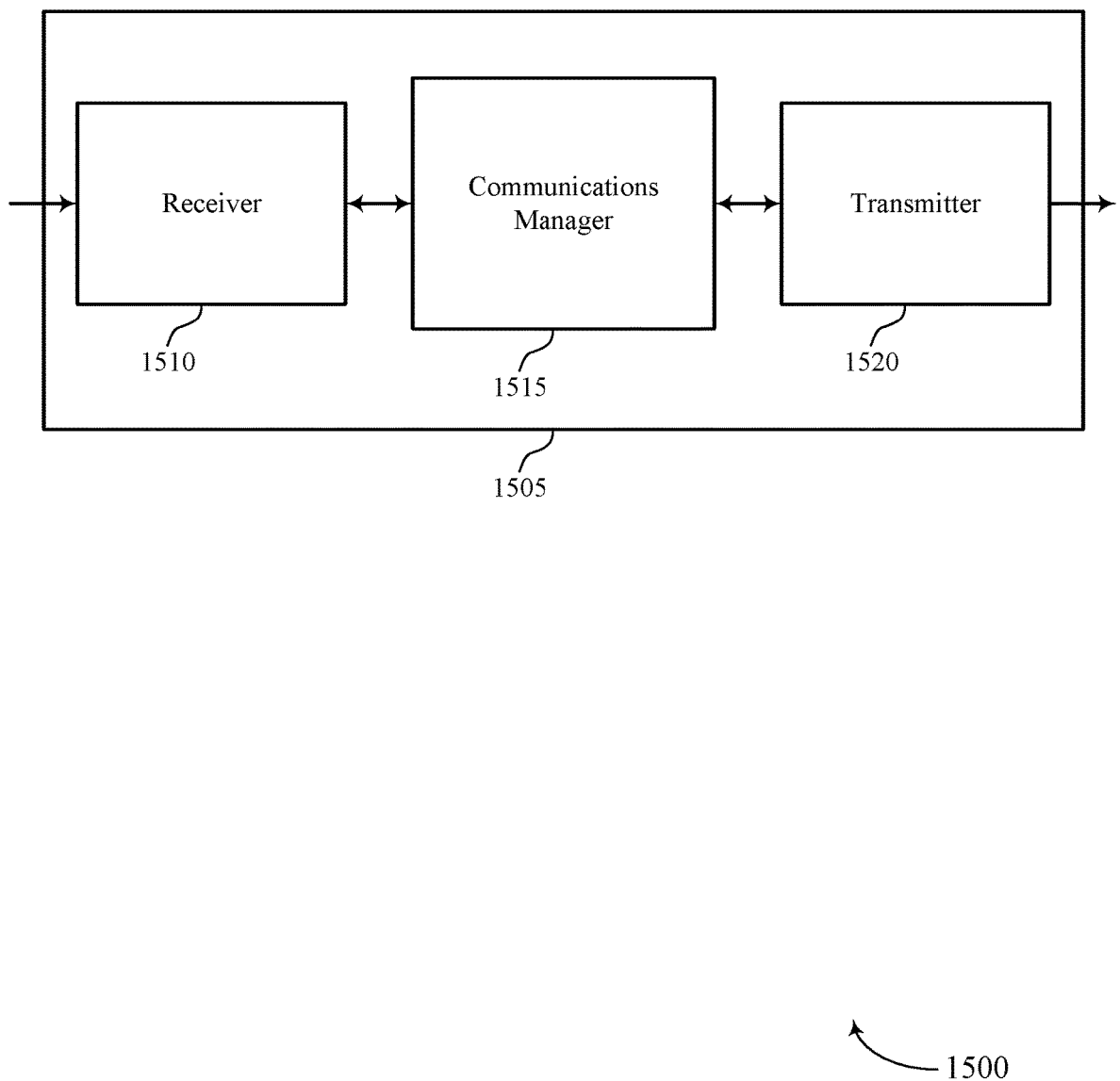
FIGS. 15 through 17 show block diagrams of a device that supports radio resource control and fronthaul control in accordance with aspects of the present disclosure.

FIG. 15 shows a block diagram 1500 of a wireless device 1505 that supports radio resource control and fronthaul control in accordance with aspects of the present disclosure. Wireless device 1505 may be an example of aspects of a base station 105 as described herein. Wireless device 1505 may include receiver 1510, communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to radio resource control and fronthaul control, etc.). Information may be passed on to other components of the device. The receiver 1510 may be an example of aspects of the transceiver 1835 described with reference to FIG. 18. The receiver 1510 may utilize a single antenna or a set of antennas.

Communications manager 1515 may be an example of aspects of the communications manager 1815 described with reference to FIG. 18.

Communications manager 1515 and/or at least some of its various sub-components may be implemented in hardware, software executed by a processor, firmware, or any combination thereof. If implemented in software executed by a processor, the functions of the communications manager 1515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 1515 and/or at least some of its various sub-components may be physically located at various positions, including being distributed such that portions of functions are implemented at different physical locations by one or more physical devices. In some examples, communications manager 1515 and/or at least some of its various sub-components may be a separate and distinct component in accordance with various aspects of the present disclosure. In other examples, communications manager 1515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 1515 may establish a SRB with a CU for exchanging control messages with the CU, identify a first set of control messages for an access radio link with the CU and a second set of control messages for a fronthaul radio link with the CU, configure a lower portion of the SRB for transmission of at least a portion of the first set of control messages and a portion of a second set of control messages, configure an upper portion of the SRB for transmission of at least a portion of the first set of control messages, multiplex the upper portion of the SRB and the second set of control messages, and transmit the multiplexed upper portion of the SRB and second set of control messages to the CU.

The communications manager 1515 may also establish a SRB with a CU for exchanging control messages with the CU, identify a first set of control messages for an access radio link with the CU and a second set of control messages for a fronthaul radio link with the CU, transmit the first set of control messages using the SRB, encapsulate one or more of the second set of control messages into the first set of control messages, and transmit the encapsulated first set of control messages using the SRB.

The communications manager 1515 may also identify a first set of control messages for an access radio link with a CU and a second set of control messages for a fronthaul radio link with the CU, establish a first RB with the CU for exchanging the first set of control messages, establish a second RB with the CU for exchanging the second set of control messages, and transmit the first set of control messages using the first RB and the second set of control messages using the second RB.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1835 described with reference to FIG. 18. The transmitter 1520 may utilize a single antenna or a set of antennas.

Figure 16:
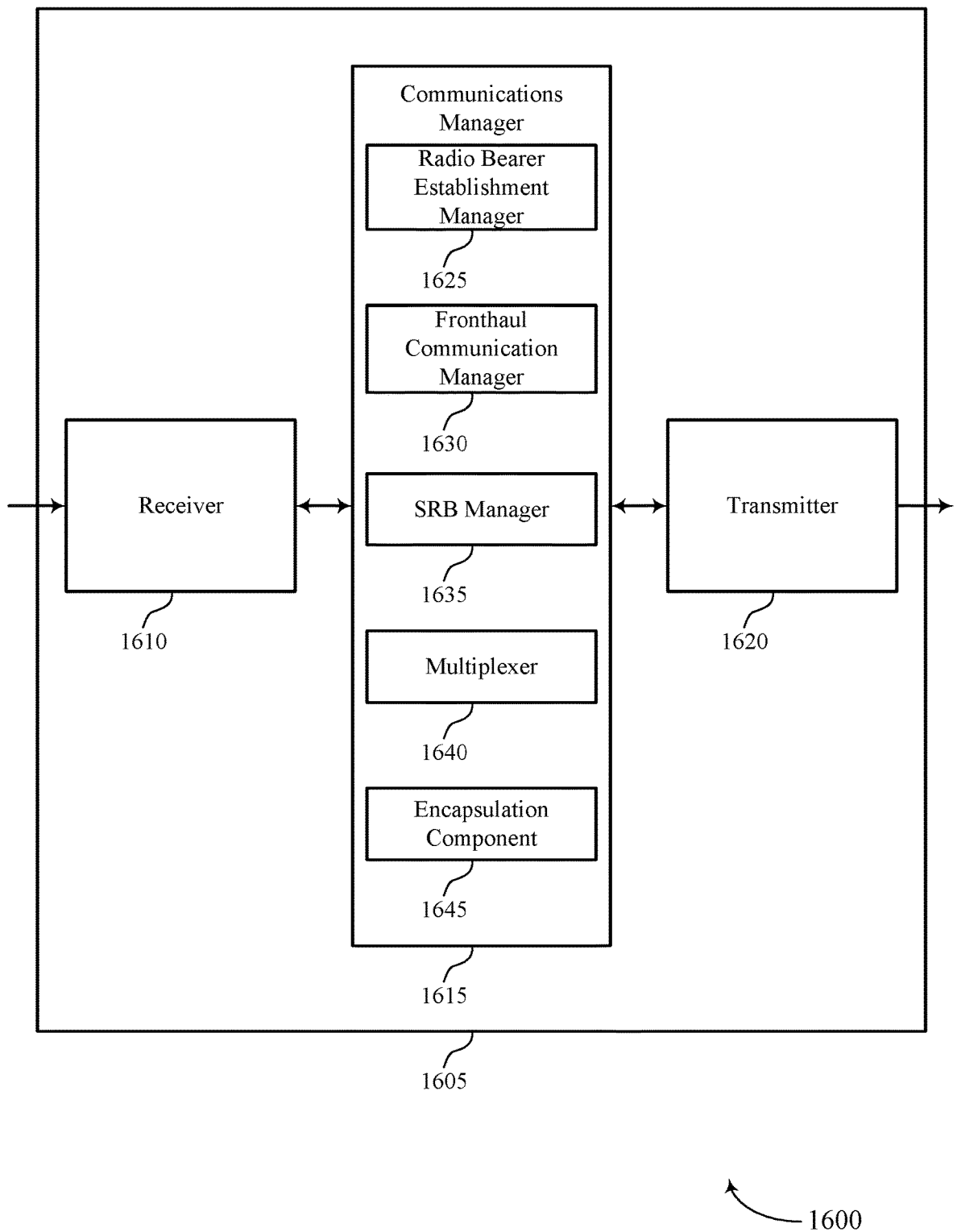

FIG. 16 shows a block diagram 1600 of a wireless device 1605 that supports radio resource control and fronthaul control in accordance with aspects of the present disclosure. Wireless device 1605 may be an example of aspects of a wireless device 1505 or a base station 105 as described with reference to FIG. 15. Wireless device 1605 may include receiver 1610, communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to radio resource control and fronthaul control, etc.). Information may be passed on to other components of the device. The receiver 1610 may be an example of aspects of the transceiver 1835 described with reference to FIG. 18. The receiver 1610 may utilize a single antenna or a set of antennas.

Communications manager 1615 may be an example of aspects of the communications manager 1815 described with reference to FIG. 18. Communications manager 1615 may also include radio bearer establishment manager 1625, fronthaul communication manager 1630, SRB manager 1635, multiplexer 1640, and encapsulation component 1645.

Radio bearer establishment manager 1625 may establish a SRB with a CU for exchanging control messages with the CU, and in some cases may establish a second SRB with the CU. In some cases, radio bearer establishment manager 1625 may establish a first RB with the CU for exchanging the first set of control messages, establish a second RB with the CU for exchanging the second set of control messages, and may also establish a third RB (e.g., SRBO) with the CU.

Fronthaul communication manager 1630 may identify a first set of control messages for an access radio link with the CU and a second set of control messages for a fronthaul radio link with the CU. In some cases, fronthaul communication manager 1630 may, receive a configuration for the upper portion of the first SRB and the lower portion of the first SRB over the second SRB. In some cases, fronthaul communication manager 1630 may transmit the encapsulated first set of control messages using the SRB. In some cases, fronthaul communication manager 1630 may transmit a multiplexed upper portion of the SRB and second set of control messages to the CU. In some cases, fronthaul communication manager 1630 may transmit the first set of control messages using the first RB and the second set of control messages using the second RB.

In some cases, the second set of control messages configure the lower portion and an upper portion of the SRB for the fronthaul radio link. In some cases, a DU) supports a UEF (e.g., an MTF) and exchanges the fronthaul radio messages with the CU over the lower portion of a radio bearer established between the UEF and a second DU. In some cases, the access radio link is established between a DU and the CU, and the first set of control messages are exchanged between the DU and the CU. In some cases, the second set of control messages are fronthaul control protocol messages and the first set of control messages are radio resource control (RRC) protocol messages. In some cases, the first set of control messages configure the lower portion of the SRB. In some cases, the first set of control messages configure the lower portion and the upper portion of the SRB for the fronthaul radio link. In some cases, the access radio link is established between a DU and the CU, and the first set of control messages are exchanged between the DU and the CU. In some cases, the second set of control messages are fronthaul control protocol messages and the first set of control messages are RRC protocol messages.

In some cases, the first set of control messages configure a lower portion of the SRB. In some cases, the second set of control messages configure the lower portion and an upper portion of the SRB for the fronthaul radio link. In some cases, a DU supports a UEF and exchanges the fronthaul radio messages with the CU over the lower portion of a radio bearer established between the UEF and a second DU. In some cases, the access radio link is established between a DU and the CU, and the first set of control messages are exchanged between the DU and the CU. In some cases, a DU supports a UEF and exchanges the fronthaul radio messages with the CU over the lower portion of a radio bearer established between the UEF and a second DU.

SRB manager 1635 may configure a lower portion of the SRB for transmission of at least a portion of the first set of control messages and a portion of a second set of control messages and configure an upper portion of the SRB for transmission of at least a portion of the first set of control messages. In some cases, the configuring the upper portion of the SRB further includes receiving a configuration for a first upper portion of the SRB and a second upper portion of the SRB, the first upper portion for RRC messages and the second upper portion for control messages associated with the access radio link, and where the first upper portion of the SRB and the second upper portion of the SRB are multiplexed with the lower portion of the SRB. In some cases, the first RB includes a first SRB with the CU and the second RB includes a second SRB with the CU.

Multiplexer 1640 may multiplex the upper portion of the SRB and the second set of control messages. In some cases, the multiplexing further includes setting a multiplexing field to indicate whether a lower portion of the SRB includes an upper portion of the SRB or a second set of control messages. Encapsulation component 1645 may encapsulate one or more of the second set of control messages into the first set of control messages.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1835 described with reference to FIG. 18. The transmitter 1620 may utilize a single antenna or a set of antennas.

Figure 17:
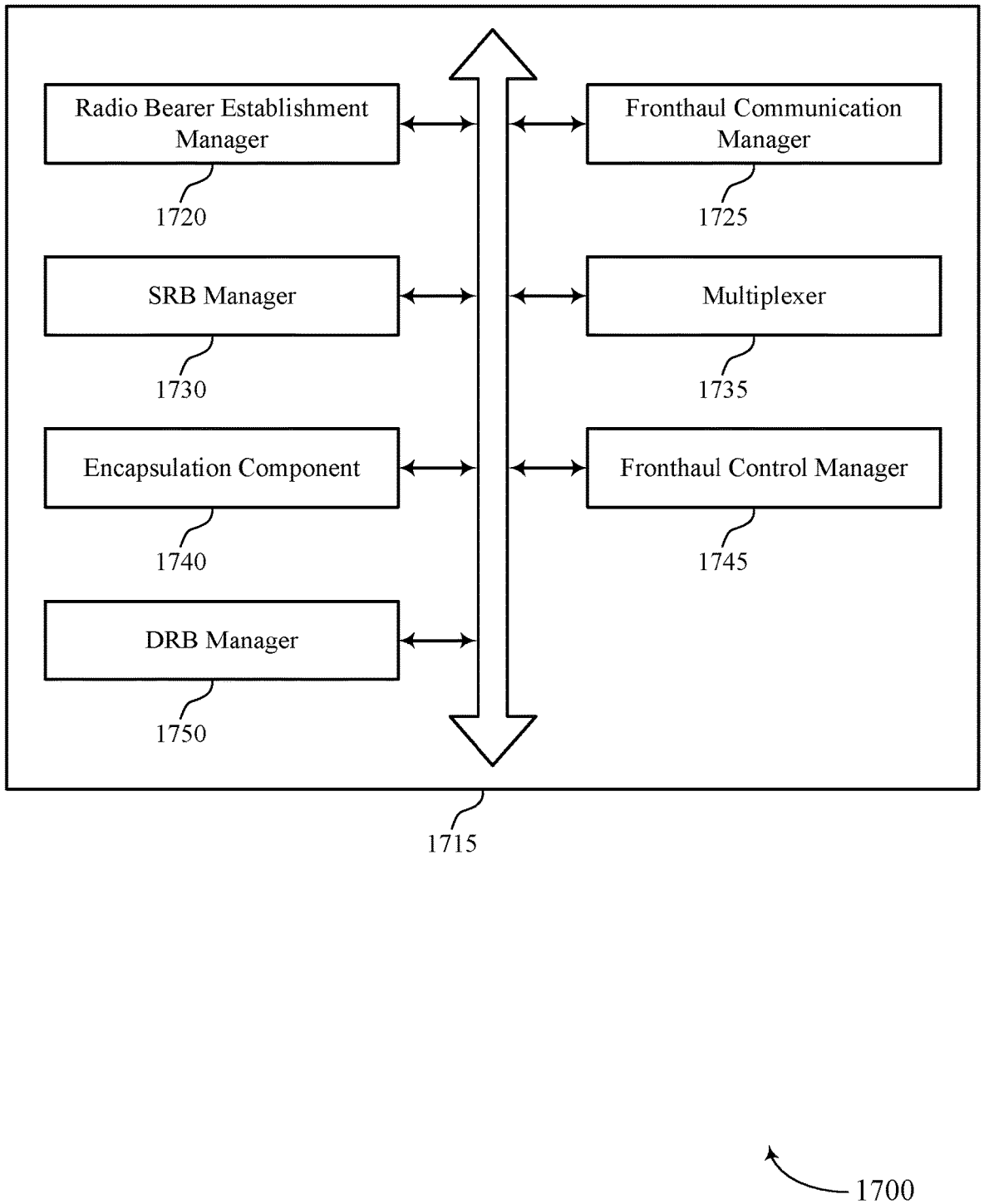

FIG. 17 shows a block diagram 1700 of a communications manager 1715 that supports radio resource control and fronthaul control in accordance with aspects of the present disclosure. The communications manager 1715 may be an example of aspects of a communications manager 1515, a communications manager 1615, or a communications manager 1815 described with reference to FIGS. 15, 16, and 18. The communications manager 1715 may include radio bearer establishment manager 1720, fronthaul communication manager 1725, SRB manager 1730, multiplexer 1735, encapsulation component 1740, fronthaul control manager 1745, and DRB manager 1750. Each of these modules may communicate, directly or indirectly, with one another (e.g., via one or more buses).

Radio bearer establishment manager 1720 may establish a SRB with a CU for exchanging control messages with the CU, and in some cases may establish a second SRB with the CU. In some cases, radio bearer establishment manager 1720 may establish a RB with the CU for exchanging the first set of control messages, establish a second RB with the CU for exchanging the second set of control messages, and may also establish a third RB (e.g., SRBO) with the CU.

Fronthaul communication manager 1725 may identify a first set of control messages for an access radio link with the CU and a second set of control messages for a fronthaul radio link with the CU. In some cases, fronthaul communication manager 1725 may, receive a configuration for the upper portion of the first SRB and the lower portion of the first SRB over the second SRB. In some cases, fronthaul communication manager 1725 may transmit the encapsulated first set of control messages using the SRB. In some cases, fronthaul communication manager 1725 may transmit a multiplexed upper portion of the SRB and second set of control messages to the CU. In some cases, fronthaul communication manager 1725 may transmit the first set of control messages using the first RB and the second set of control messages using the second RB.

In some cases, the second set of control messages configure the lower portion and an upper portion of the SRB for the fronthaul radio link. In some cases, a DU) supports a UEF (e.g., an MTF) and exchanges the fronthaul radio messages with the CU over the lower portion of a radio bearer established between the UEF and a second DU. In some cases, the access radio link is established between a DU and the CU, and the first set of control messages are exchanged between the DU and the CU. In some cases, the second set of control messages are fronthaul control protocol messages and the first set of control messages are RRC protocol messages. In some cases, the first set of control messages configure the lower portion of the SRB. In some cases, the first set of control messages configure the lower portion and the upper portion of the SRB for the fronthaul radio link. In some cases, the access radio link is established between a DU and the CU, and the first set of control messages are exchanged between the DU and the CU. In some cases, the second set of control messages are fronthaul control protocol messages and the first set of control messages are RRC protocol messages.

In some cases, the first set of control messages configure a lower portion of the SRB. In some cases, the second set of control messages configure the lower portion and an upper portion of the SRB for the fronthaul radio link. In some cases, a DU supports a UEF (e.g., an MTF) and exchanges the fronthaul radio messages with the CU over the lower portion of a radio bearer established between the UEF and a second DU. In some cases, the access radio link is established between a DU and the CU, and the first set of control messages are exchanged between the DU and the CU. In some cases, a DU supports a UEF and exchanges the fronthaul radio messages with the CU over the lower portion of a radio bearer established between the UEF and a second DU.

SRB manager 1730 may configure a lower portion of the SRB for transmission of at least a portion of the first set of control messages and a portion of a second set of control messages and configure an upper portion of the SRB for transmission of at least a portion of the first set of control messages. In some cases, the configuring the upper portion of the SRB further includes receiving a configuration for a first upper portion of the SRB and a second upper portion of the SRB, the first upper portion for RRC messages and the second upper portion for control messages associated with the access radio link, and where the first upper portion of the SRB and the second upper portion of the SRB are multiplexed with the lower portion of the SRB. In some cases, the first RB includes a first SRB with the CU and the second RB includes a second SRB with the CU.

Multiplexer 1735 may multiplex the upper portion of the SRB and the second set of control messages. In some cases, the multiplexing further includes setting a multiplexing field to indicate whether a lower portion of the SRB includes an upper portion of the SRB or a second set of control messages. Encapsulation component 1740 may encapsulate one or more of the second set of control messages into the first set of control messages.

Fronthaul control manager 1745 may configure the lower portion of the SRB to be terminated at a DU and the upper portion of the SRB may be tunneled through the DU directly to the CU.

DRB manager 1750 may establish a DRB with the CU for exchanging data packets with the CU. In some cases, the first RB includes a first SRB for exchanging control plane control messages with the CU, and the second RB includes a first DRB for exchanging RRC messages with the CU.

Figure 18:
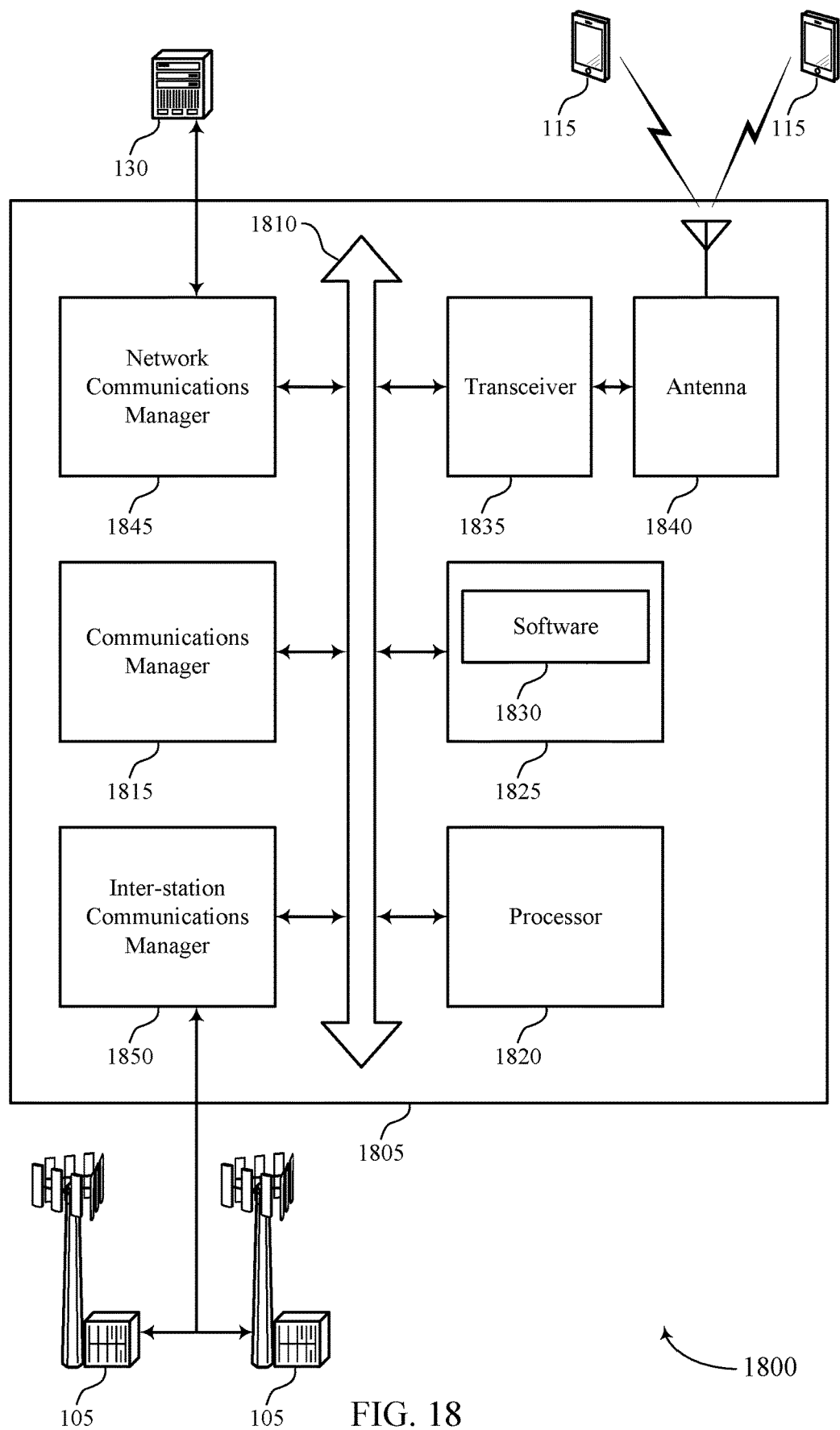
FIG. 18 illustrates a block diagram of a system including a base station that supports radio resource control and fronthaul control in accordance with aspects of the present disclosure.

FIG. 18 shows a diagram of a system 1800 including a device 1805 that supports radio resource control and fronthaul control in accordance with aspects of the present disclosure. Device 1805 may be an example of or include the components of wireless device 1505, wireless device 1605, or a base station 105 as described above, e.g., with reference to FIGS. 15 and 16. Device 1805 may include components for bi-directional voice and data communications including components for transmitting and receiving communications, including communications manager 1815, processor 1820, memory 1825, software 1830, transceiver 1835, antenna 1840, network communications manager 1845, and inter-station communications manager 1850. These components may be in electronic communication via one or more buses (e.g., bus 1810). Device 1805 may communicate wirelessly with one or more UEs 115.

Processor 1820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1820 may be configured to operate a memory array using a memory controller. In other cases, a memory controller may be integrated into processor 1820. Processor 1820 may be configured to execute computer-readable instructions stored in a memory to perform various functions (e.g., functions or tasks supporting radio resource control and fronthaul control).

Memory 1825 may include random access memory (RAM) and read only memory (ROM). The memory 1825 may store computer-readable, computer-executable software 1830 including instructions that, when executed, cause the processor to perform various functions described herein. In some cases, the memory 1825 may contain, among other things, a basic input/output system (BIOS) which may control basic hardware or software operation such as the interaction with peripheral components or devices.

Software 1830 may include code to implement aspects of the present disclosure, including code to support radio resource control and fronthaul control. Software 1830 may be stored in a non-transitory computer-readable medium such as system memory or other memory. In some cases, the software 1830 may not be directly executable by the processor but may cause a computer (e.g., when compiled and executed) to perform functions described herein.

Transceiver 1835 may communicate bi-directionally, via one or more antennas, wired, or wireless links as described above. For example, the transceiver 1835 may represent a wireless transceiver and may communicate bi-directionally with another wireless transceiver. The transceiver 1835 may also include a modem to modulate the packets and provide the modulated packets to the antennas for transmission, and to demodulate packets received from the antennas.

In some cases, the wireless device may include a single antenna 1840. However, in some cases the device may have more than one antenna 1840, which may be capable of concurrently transmitting or receiving multiple wireless transmissions.

Network communications manager 1845 may manage communications with the core network (e.g., via one or more wired backhaul links). For example, the network communications manager 1845 may manage the transfer of data communications for client devices, such as one or more UEs 115.

Inter-station communications manager 1850 may manage communications with other base station 105, and may include a controller or scheduler for controlling communications with UEs 115 in cooperation with other base stations 105. For example, the inter-station communications manager 1850 may coordinate scheduling for transmissions to UEs 115 for various interference mitigation techniques such as beamforming or joint transmission. In some examples, inter-station communications manager 1850 may provide an X2 interface within an LTE/LTE-A wireless communication network technology to provide communication between base stations 105.

Figure 19:
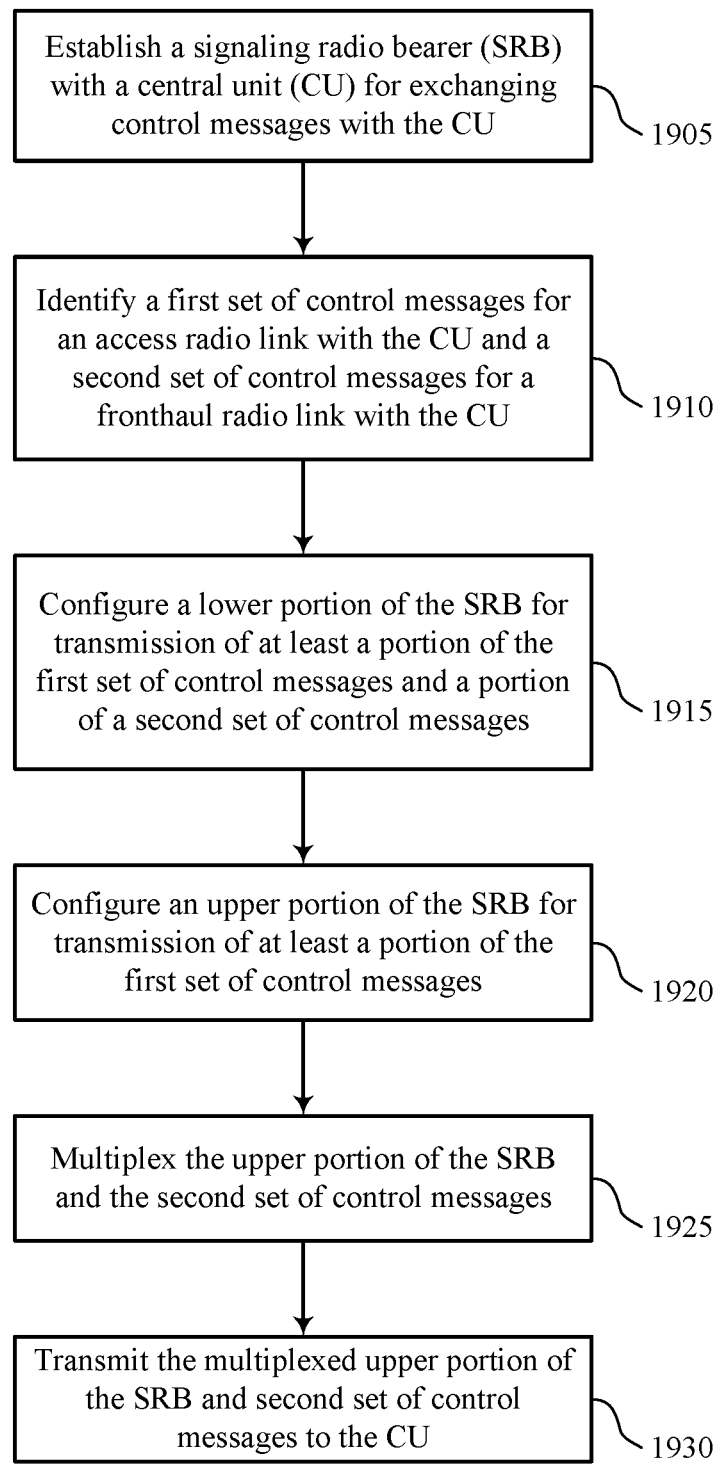
FIGS. 19 through 21 illustrate methods for radio resource control and fronthaul control in accordance with aspects of the present disclosure.

FIG. 19 shows a flowchart illustrating a method 1900 for radio resource control and fronthaul control in accordance with aspects of the present disclosure. The operations of method 1900 may be implemented by a base station 105 or its components as described herein. For example, the operations of method 1900 may be performed by a communications manager as described with reference to FIGS. 15 through 18. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may establish a SRB with a CU for exchanging control messages with the CU. The operations of block 1905 may be performed according to the methods described herein. In certain examples, aspects of the operations of block 1905 may be performed by a radio bearer establishment manager as described with reference to FIGS. 15 through 18.

At block 1910 the base station 105 may identify a first set of control messages for an access radio link with the CU and a second set of control messages for a fronthaul radio link with the CU. The operations of block 1910 may be performed according to the methods described herein. In certain examples, aspects of the operations of block 1910 may be performed by a fronthaul communication manager as described with reference to FIGS. 15 through 18.

At block 1915 the base station 105 may configure a lower portion of the SRB for transmission of at least a portion of the first set of control messages and a portion of a second set of control messages. The operations of block 1915 may be performed according to the methods described herein. In certain examples, aspects of the operations of block 1915 may be performed by a SRB manager as described with reference to FIGS. 15 through 18.

At block 1920 the base station 105 may configure an upper portion of the SRB for transmission of at least a portion of the first set of control messages. The operations of block 1920 may be performed according to the methods described herein. In certain examples, aspects of the operations of block 1920 may be performed by a SRB manager as described with reference to FIGS. 15 through 18.

At block 1925 the base station 105 may multiplex the upper portion of the SRB and the second set of control messages. The operations of block 1925 may be performed according to the methods described herein. In certain examples, aspects of the operations of block 1925 may be performed by a multiplexer as described with reference to FIGS. 15 through 18.

At block 1930 the base station 105 may transmit the multiplexed upper portion of the SRB and second set of control messages to the CU. The operations of block 1930 may be performed according to the methods described herein. In certain examples, aspects of the operations of block 1930 may be performed by a fronthaul communication manager as described with reference to FIGS. 15 through 18.

Figure 20:
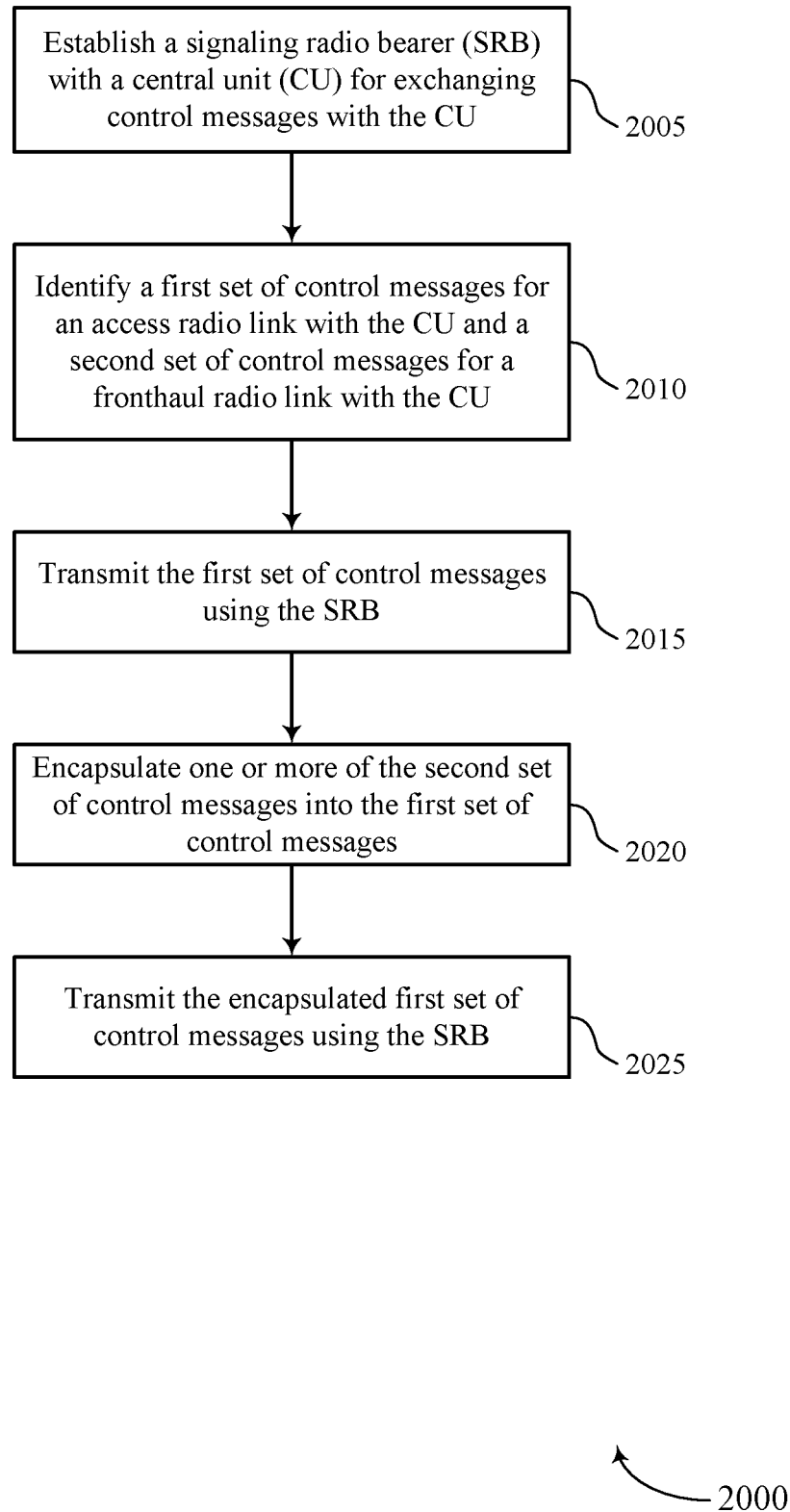

FIG. 20 shows a flowchart illustrating a method 2000 for radio resource control and fronthaul control in accordance with aspects of the present disclosure. The operations of method 2000 may be implemented by a base station 105 or its components as described herein. For example, the operations of method 2000 may be performed by a communications manager as described with reference to FIGS. 15 through 18. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may establish a SRB with a CU for exchanging control messages with the CU. The operations of block 2005 may be performed according to the methods described herein. In certain examples, aspects of the operations of block 2005 may be performed by a radio bearer establishment manager as described with reference to FIGS. 15 through 18.

At block 2010 the base station 105 may identify a first set of control messages for an access radio link with the CU and a second set of control messages for a fronthaul radio link with the CU. The operations of block 2010 may be performed according to the methods described herein. In certain examples, aspects of the operations of block 2010 may be performed by a fronthaul communication manager as described with reference to FIGS. 15 through 18.

At block 2015 the base station 105 may transmit the first set of control messages using the SRB. The operations of block 2015 may be performed according to the methods described herein. In certain examples, aspects of the operations of block 2015 may be performed by a fronthaul communication manager as described with reference to FIGS. 15 through 18.

At block 2020 the base station 105 may encapsulate one or more of the second set of control messages into the first set of control messages. The operations of block 2020 may be performed according to the methods described herein. In certain examples, aspects of the operations of block 2020 may be performed by a encapsulation component as described with reference to FIGS. 15 through 18.

At block 2025 the base station 105 may transmit the encapsulated first set of control messages using the SRB. The operations of block 2025 may be performed according to the methods described herein. In certain examples, aspects of the operations of block 2025 may be performed by a fronthaul communication manager as described with reference to FIGS. 15 through 18.

Figure 21:
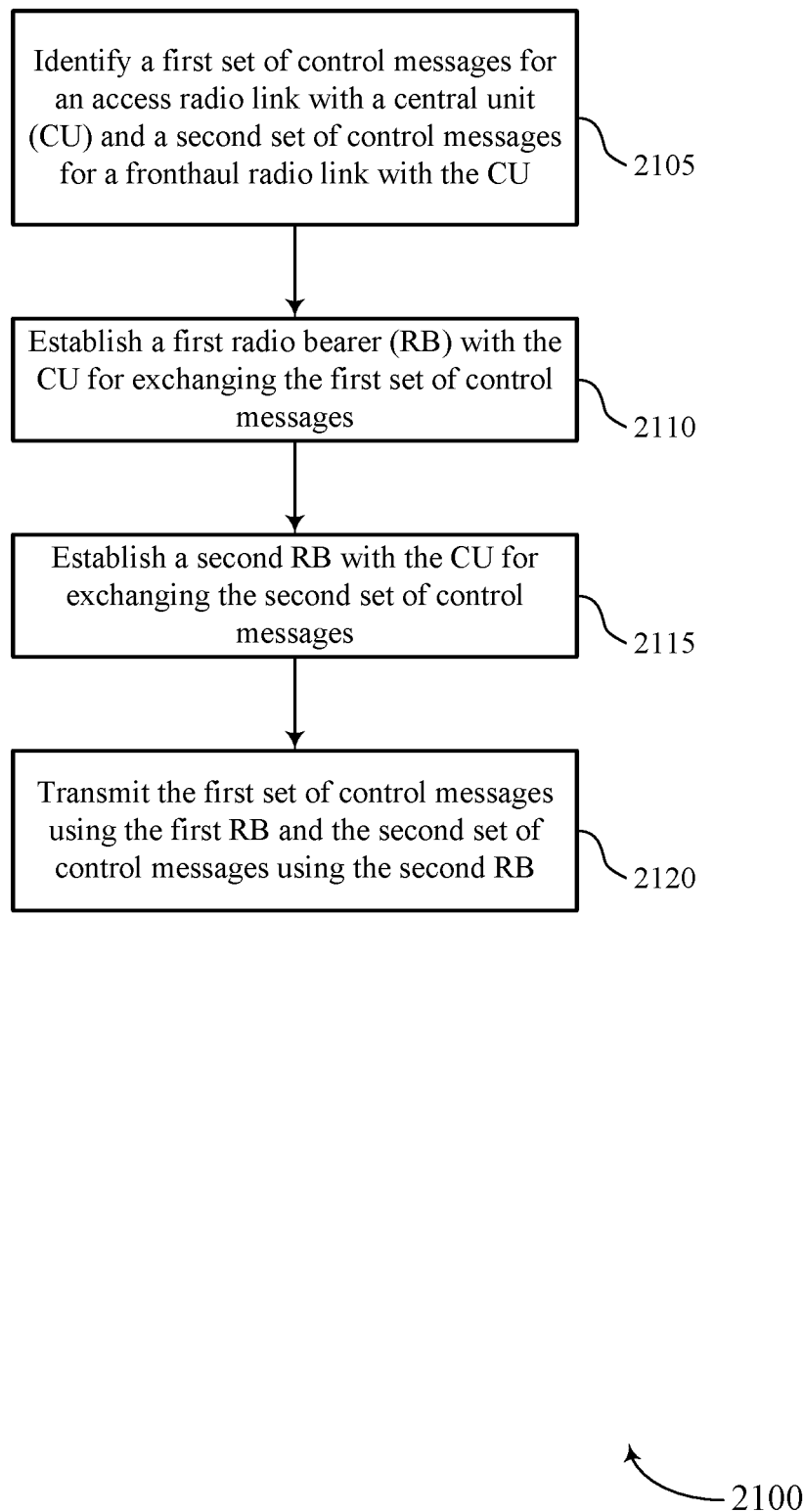

FIG. 21 shows a flowchart illustrating a method 2100 for radio resource control and fronthaul control in accordance with aspects of the present disclosure. The operations of method 2100 may be implemented by a base station 105 or its components as described herein. For example, the operations of method 2100 may be performed by a communications manager as described with reference to FIGS. 15 through 18. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may identify a first set of control messages for an access radio link with a CU and a second set of control messages for a fronthaul radio link with the CU. The operations of block 2105 may be performed according to the methods described herein. In certain examples, aspects of the operations of block 2105 may be performed by a fronthaul communication manager as described with reference to FIGS. 15 through 18.

At block 2110 the base station 105 may establish a first RB with the CU for exchanging the first set of control messages. The operations of block 2110 may be performed according to the methods described herein. In certain examples, aspects of the operations of block 2110 may be performed by a radio bearer establishment manager as described with reference to FIGS. 15 through 18.

At block 2115 the base station 105 may establish a second RB with the CU for exchanging the second set of control messages. The operations of block 2115 may be performed according to the methods described herein. In certain examples, aspects of the operations of block 2115 may be performed by a radio bearer establishment manager as described with reference to FIGS. 15 through 18.

At block 2120 the base station 105 may transmit the first set of control messages using the first RB and the second set of control messages using the second RB. The operations of block 2120 may be performed according to the methods described herein. In certain examples, aspects of the operations of block 2120 may be performed by a fronthaul communication manager as described with reference to FIGS. 15 through 18.

In some examples, aspects from two or more of the methods 1900, 2000, or 2100 described with reference to FIG. 19, 20, or 21 may be combined. It should be noted that the methods 1900, 2000, or 2100 are just example implementations, and that the operations of the methods 1900, 2000, or 2100 may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   establishing a signaling radio bearer (SRB) with a central unit (CU) for exchanging control messages with the CU;
   identifying a first set of control messages for an access radio link with the CU and a second set of control messages for a fronthaul radio link with the CU;
   configuring a lower portion of the SRB, that interconnects a user equipment (UE) with the CU via at least one distributed unit (DU), for transmission of at least a first portion of the first set of control messages and a portion of the second set of control messages;
   configuring an upper portion of the SRB, that interconnects the UE with the CU, for transmission of at least a second portion of the first set of control messages;
   multiplexing the upper portion of the SRB and the second set of control messages; and
   transmitting the multiplexed upper portion of the SRB and second set of control messages to the CU.

2. The method of claim 1, wherein:
   the multiplexing further comprises setting a multiplexing field to indicate whether a lower portion of the SRB includes the upper portion of the SRB or the second set of control messages.

3. The method of claim 1, wherein:
   the lower portion of the SRB is terminated at a distributed unit (DU) and the upper portion of the SRB is tunneled through the DU directly to the CU.

4. The method of claim 1, wherein:
   the configuring the upper portion of the SRB further comprises receiving a configuration for a first upper portion of the SRB and a second upper portion of the SRB, the first upper portion for radio resource control (RRC) messages for the access radio link and the second upper portion for control messages associated with the DU, and wherein the first upper portion of the SRB and the second upper portion of the SRB are multiplexed with the lower portion of the SRB.

5. The method of claim 1, further comprising:
   establishing a second SRB with the CU; and
   receiving a configuration for the upper portion of the first SRB and the lower portion of the first SRB over the second SRB.

6. The method of claim 1, wherein:
   a distributed unit (DU) supports a user equipment function (UEF) and exchanges fronthaul radio messages with the CU over the lower portion of a radio bearer established between the UEF and a second DU.

7. The method of claim 1, wherein:
the access radio link is established between a user equipment function (UEF) and the CU, and the first set of control messages are exchanged between the UEF and the CU.

8. The method of claim 1, wherein:
the second set of control messages are fronthaul control protocol messages and the first set of control messages are radio resource control (RRC) protocol messages.

9. The method of claim 1, wherein:
the first set of control messages configure the lower portion of the SRB.

10. The method of claim 9, wherein:
the first set of control messages configure the lower portion and the upper portion of the SRB for the fronthaul radio link.

11. A method for wireless communication, comprising:
establishing a signaling radio bearer (SRB) with a central unit (CU) for exchanging control messages with the CU;
identifying a first set of control messages for an access radio link with the CU and a second set of control messages for a fronthaul radio link with the CU;
transmitting the first set of control messages using the SRB;
encapsulating one or more of the second set of control messages into the first set of control messages; and
transmitting the encapsulated first set of control messages using the SRB.

12. The method of claim 11, further comprising:
establishing a second SRB with the CU; and
receiving a configuration for the first SRB over the second SRB.

13. The method of claim 11, wherein:
a first distributed unit (DU) supports a user equipment function (UEF) and exchanges fronthaul radio messages with the CU over a lower portion of a radio bearer established between the UEF and a second DU.

14. The method of claim 11, wherein:
the access radio link is established between a user equipment function (UEF) and the CU, and the first set of control messages are exchanged between the UEF and the CU.

15. The method of claim 11, wherein:
the second set of control messages are fronthaul control protocol messages and the first set of control messages are radio resource control (RRC) protocol messages.

16. The method of claim 11, wherein:
the first set of control messages configure a lower portion of the SRB that interconnects a user equipment (UE) with the CU via at least one distributed unit (DU).

17. The method of claim 16, wherein:
the second set of control messages configure the lower portion and an upper portion of the SRB, that interconnects the UE with the CU, for the fronthaul radio link.

18. A method for wireless communication, comprising:
identifying a first set of control messages for an access radio link with a central unit (CU) and a second set of control messages for a fronthaul radio link with the CU, wherein the access radio link is established between a distributed unit (DU) and the CU;
establishing a first radio bearer (RB) with the CU for exchanging the first set of control messages;
establishing a second RB with the CU for exchanging the second set of control messages between the DU and the CU; and
transmitting the first set of control messages using the first RB and the second set of control messages using the second RB.

19. The method of claim 18, wherein:
the first RB comprises a first signaling radio bearer (SRB) with the CU and the second RB comprises a second SRB with the CU.

20. The method of claim 18, wherein:
the first RB comprises a first signaling radio bearer (SRB) for exchanging radio resource control (RRC) messages with the CU, and the second RB comprises a first data radio bearer (DRB) for exchanging fronthaul control messages with the CU.

21. The method of claim 20, further comprising:
establishing a second DRB with the CU for exchanging data packets with the CU.

22. The method of claim 18, further comprising:
establishing a third RB with the CU; and
receiving a configuration for the first RB and the second RB over the third RB.

23. The method of claim 18, wherein:
a first distributed unit (DU) supports a user equipment function (UEF) and exchanges fronthaul radio messages with the CU over a lower portion of a radio bearer that interconnects the UEF and a second DU.

24. The method of claim 18, wherein:
the second set of control messages are fronthaul control protocol messages and the first set of control messages are radio resource control (RRC) protocol messages.

25. The method of claim 18, wherein:
the first set of control messages configure a lower portion of a signaling radio bearer (SRB) that interconnects a user equipment (UE) with the CU via at least one distributed unit (CU).

26. The method of claim 25, wherein:
the second set of control messages configure the lower portion and an upper portion of the SRB, that interconnects the UE with the CU, for the fronthaul radio link.

27. An apparatus for wireless communication, comprising:
a processor;
memory in electronic communication with the processor;
a transmitter; and
instructions stored in the memory and operable, when executed by the processor, to cause the apparatus to:
establish a signaling radio bearer (SRB) with a central unit (CU) for exchanging control messages with the CU;
identify a first set of control messages for an access radio link with the CU and a second set of control messages for a fronthaul radio link with the CU;
configure a lower portion of the SRB, that interconnects a user equipment (UE) with the CU via at least one distributed unit (DU), for transmission of at least a first portion of the first set of control messages and a portion of the second set of control messages;
configure an upper portion of the SRB, that interconnects the UE with the CU, for transmission of at least a second portion of the first set of control messages;
multiplex the upper portion of the SRB and the second set of control messages; and
transmit, via the transmitter, the multiplexed upper portion of the SRB and second set of control messages to the CU.

28. The apparatus of claim 27, wherein the instructions to multiplex the upper portion of the SRB and the second set of control messages are further executable by the processor to cause the apparatus to:
set a multiplexing field to indicate whether a lower portion of the SRB includes the upper portion of the SRB or the second set of control messages.

29. The apparatus of claim 27, wherein:
the lower portion of the SRB is terminated at a distributed unit (DU) and the upper portion of the SRB is tunneled through the DU directly to the CU.

30. The apparatus of claim 27, wherein the instructions to configure the upper portion of the SRB are further executable by the processor to cause the apparatus to:
receive a configuration for a first upper portion of the SRB and a second upper portion of the SRB, the first upper portion for radio resource control (RRC) messages for the access radio link and the second upper portion for control messages associated with the DU, and wherein the first upper portion of the SRB and the second upper portion of the SRB are multiplexed with the lower portion of the SRB.

31. The apparatus of claim 27, wherein the instructions are further executable by the processor to cause the apparatus to:
establish a second SRB with the CU; and
receive a configuration for the upper portion of the first SRB and the lower portion of the first SRB over the second SRB.

32. The apparatus of claim 27, wherein:
a distributed unit (DU) supports a user equipment function (UEF) and exchanges fronthaul radio messages with the CU over the lower portion of a radio bearer established between the UEF and a second DU.

33. The apparatus of claim 27, wherein:
the access radio link is established between a user equipment function (UEF) and the CU, and the first set of control messages are exchanged between the UEF and the CU.

34. The apparatus of claim 27, wherein:
the second set of control messages are fronthaul control protocol messages and the first set of control messages are radio resource control (RRC) protocol messages.

35. The apparatus of claim 27, wherein:
the first set of control messages configure the lower portion of the SRB.

36. The apparatus of claim 35, wherein:
the first set of control messages configure the lower portion and the upper portion of the SRB for the fronthaul radio link.

37. An apparatus for wireless communication, comprising:
a processor;
memory in electronic communication with the processor;
a transmitter; and
instructions stored in the memory and operable, when executed by the processor, to cause the apparatus to:
establish a signaling radio bearer (SRB) with a central unit (CU) for exchanging control messages with the CU;
identify a first set of control messages for an access radio link with the CU and a second set of control messages for a fronthaul radio link with the CU;
transmit, via the transmitter, the first set of control messages using the SRB;
encapsulate one or more of the second set of control messages into the first set of control messages; and
transmit the encapsulated first set of control messages using the SRB.

38. The apparatus of claim 37, wherein the instructions are further executable by the processor to cause the apparatus to:
establish a second SRB with the CU; and
receive a configuration for the first SRB over the second SRB.

39. The apparatus of claim 37, wherein:
a first distributed unit (DU) supports a user equipment function (UEF) and exchanges fronthaul radio messages with the CU over a lower portion of a radio bearer established between the UEF and a second DU.

40. The apparatus of claim 37, wherein:
the access radio link is established between a user equipment function (UEF) and the CU, and the first set of control messages are exchanged between the UEF and the CU.

41. The apparatus of claim 37, wherein:
the second set of control messages are fronthaul control protocol messages and the first set of control messages are radio resource control (RRC) protocol messages.

42. The apparatus of claim 37, wherein:
the first set of control messages configure a lower portion of the SRB that interconnects a user equipment (UE) with the CU via at least one distributed unit (DU).

43. The apparatus of claim 42, wherein:
the second set of control messages configure the lower portion and an upper portion of the SRB, that interconnects the UE with the CU, for the fronthaul radio link.

44. An apparatus for wireless communication, comprising:
a processor;
memory in electronic communication with the processor;
a transmitter; and
instructions stored in the memory and operable, when executed by the processor, to cause the apparatus to:
identify a first set of control messages for an access radio link with a central unit (CU) and a second set of control messages for a fronthaul radio link with the CU, wherein the access radio link is established between a distributed unit (DU) and the CU;
establish a first radio bearer (RB) with the CU for exchanging the first set of control messages;
establish a second RB with the CU for exchanging the second set of control messages between the DU and the CU; and
transmit, via the transmitter, the first set of control messages using the first RB and the second set of control messages using the second RB.

45. The apparatus of claim 44, wherein:
the first RB comprises a first signaling radio bearer (SRB) with the CU and the second RB comprises a second SRB with the CU.

46. The apparatus of claim 44, wherein:
the first RB comprises a first signaling radio bearer (SRB) for exchanging radio resource control (RRC) messages with the CU, and the second RB comprises a first data radio bearer (DRB) for exchanging fronthaul control messages with the CU.

47. The apparatus of claim 46, wherein the instructions are further executable by the processor to cause the apparatus to:
establish a second DRB with the CU for exchanging data packets with the CU.

48. The apparatus of claim 44, wherein the instructions are further executable by the processor to cause the apparatus to:
    establish a third RB with the CU; and
    receive a configuration for the first RB and the second RB over the third RB.

49. The apparatus of claim 44, wherein:
    a first distributed unit (DU) supports a user equipment function (UEF) and exchanges fronthaul radio messages with the CU over a lower portion of a radio bearer that interconnects the UEF and a second DU.

50. The apparatus of claim 44, wherein:
    the second set of control messages are fronthaul control protocol messages and the first set of control messages are radio resource control (RRC) protocol messages.

51. The apparatus of claim 44, wherein:
    the first set of control messages configure a lower portion of a signaling radio bearer (SRB) that interconnects a user equipment (UE) with the CU via at least one distributed unit (DU).

52. The apparatus of claim 51, wherein:
    the second set of control messages configure the lower portion and an upper portion of the SRB, that that interconnects the UE with the CU, for the fronthaul radio link.

53. A non-transitory computer readable medium storing code for wireless communication, the code comprising instructions executable by a processor to:
    establish a signaling radio bearer (SRB) with a central unit (CU) for exchanging control messages with the CU;
    identify a first set of control messages for an access radio link with the CU and a second set of control messages for a fronthaul radio link with the CU;
    configure a lower portion of the SRB, that interconnects a user equipment (UE) with the CU via at least one distributed unit (DU), for transmission of at least a first portion of the first set of control messages and a portion of the second set of control messages;
    configure an upper portion of the SRB, that interconnects the UE with the CU, for transmission of at least a second portion of the first set of control messages;
    multiplex the upper portion of the SRB and the second set of control messages; and
    transmit the multiplexed upper portion of the SRB and second set of control messages to the CU.

54. A non-transitory computer readable medium storing code for wireless communication, the code comprising instructions executable by a processor to:
    establish a signaling radio bearer (SRB) with a central unit (CU) for exchanging control messages with the CU;
    identify a first set of control messages for an access radio link with the CU and a second set of control messages for a fronthaul radio link with the CU;
    transmit the first set of control messages using the SRB;
    encapsulate one or more of the second set of control messages into the first set of control messages; and
    transmit the encapsulated first set of control messages using the SRB.

55. A non-transitory computer readable medium storing code for wireless communication, the code comprising instructions executable by a processor to:
    identify a first set of control messages for an access radio link with a central unit (CU) and a second set of control messages for a fronthaul radio link with the CU, wherein the access radio link is established between a distributed unit (DU) and the CU;
    establish a first radio bearer (RB) with the CU for exchanging the first set of control messages;
    establish a second RB with the CU for exchanging the second set of control messages between the DU and the CU; and
    transmit the first set of control messages using the first RB and the second set of control messages using the second RB.

* * * * *